US007378024B2

(12) United States Patent
Bartels et al.

(10) Patent No.: US 7,378,024 B2
(45) Date of Patent: May 27, 2008

(54) METHODS FOR IMPROVING FILTRATION PERFORMANCE OF HOLLOW FIBER MEMBRANES

(75) Inventors: Craig Bartels, San Diegp, CA (US); Uri Papouktchiev, Carlsbad, CA (US)

(73) Assignee: Hydranautics, Oceanside, CA (US)

( * ) Notice: Subject to any disclaimer, the term of this patent is extended or adjusted under 35 U.S.C. 154(b) by 0 days.

(21) Appl. No.: 10/323,232

(22) Filed: Dec. 18, 2002

(65) Prior Publication Data
US 2003/0150807 A1 Aug. 14, 2003

Related U.S. Application Data

(60) Provisional application No. 60/347,578, filed on Jan. 9, 2002.

(51) Int. Cl.
*B01D 65/02* (2006.01)
(52) U.S. Cl. .................. 210/636; 210/94; 210/96.2; 210/321.69; 210/500.23; 210/650; 700/273
(58) Field of Classification Search ................. 210/85, 210/87, 90, 96.2, 138–143, 321.69, 500.23, 210/636, 650, 652, 639, 94, 745; 55/283, 55/288, 291; 436/164, 172
See application file for complete search history.

(56) References Cited

U.S. PATENT DOCUMENTS

| 3,992,301 | A | * | 11/1976 | Shippey et al. ............. 210/636 |
| 4,207,182 | A | | 6/1980 | Marze |
| 4,451,424 | A | | 5/1984 | Tweddle et al. |
| 4,717,395 | A | | 1/1988 | Chiao |
| 4,721,568 | A | | 1/1988 | Buys et al. |
| 4,793,629 | A | | 12/1988 | Konig et al. |
| 4,900,449 | A | | 2/1990 | Kraus et al. |
| 4,921,610 | A | * | 5/1990 | Ford et al. .................. 210/636 |
| 5,178,765 | A | | 1/1993 | Hu et al. |
| 5,207,908 | A | | 5/1993 | Koenhen et al. |
| 5,342,521 | A | | 8/1994 | Bardot et al. |
| 5,376,274 | A | | 12/1994 | Muller et al. |
| 5,403,479 | A | * | 4/1995 | Smith et al. ................ 210/636 |
| 5,435,969 | A | * | 7/1995 | Hoots et al. .................. 422/14 |

(Continued)

FOREIGN PATENT DOCUMENTS

| WO | WO 93/02779 | 2/1993 |
| WO | WO 99/07459 | 2/1999 |

OTHER PUBLICATIONS

Supplementary European Search Report from EP Application No. 02 80 6469.

*Primary Examiner*—Joseph Drodge
(74) *Attorney, Agent, or Firm*—Foley & Lardner, LLP

(57) ABSTRACT

In accordance with the present invention, there are provided methods for improving performance of hollow fiber filtration membrane modules. Invention methods comprise a unique backwashing technique wherein the hollow fiber membranes within the module are pressurized with a gas on the feed side at specified times during the backwash. Periodic use of invention methods effectively removes fouling components from the hollow-fiber membranes, thereby providing stable permeability and low trans-membrane pressures, which results in an efficient and economic filtration process. In addition, there are provided methods for cleaning hollow fiber membranes and increasing filtrate flow rate through membranes.

33 Claims, 17 Drawing Sheets

U.S. PATENT DOCUMENTS

| | | |
|---|---|---|
| 5,558,774 A | 9/1996 | Tonelli et al. |
| 5,560,828 A | 10/1996 | Wenten et al. |
| 5,639,373 A | 6/1997 | Mahendran et al. |
| 5,690,830 A * | 11/1997 | Ohtani et al. ............... 210/636 |
| 5,698,105 A | 12/1997 | Colquhoun et al. |
| 5,874,165 A | 2/1999 | Drumheller |
| 5,897,955 A | 4/1999 | Drumheller |
| 5,910,250 A | 6/1999 | Mahendran et al. |
| 5,914,182 A | 6/1999 | Drumheller |
| 5,918,264 A | 6/1999 | Drummond et al. |
| 5,944,997 A | 8/1999 | Pedersen et al. |
| 5,958,243 A | 9/1999 | Lawrence et al. |
| 6,027,649 A | 2/2000 | Benedek et al. |
| 6,077,435 A * | 6/2000 | Beck et al. ................. 210/636 |
| 6,156,200 A | 12/2000 | Zha et al. |
| 6,159,373 A | 12/2000 | Beck et al. |
| 6,183,639 B1 | 2/2001 | de Winter |
| 6,193,890 B1 | 2/2001 | Pedersen |
| 6,203,699 B1 | 3/2001 | Blume et al. |
| 6,245,239 B1 | 6/2001 | Cote et al. |
| 6,251,275 B1 | 6/2001 | Rekers |
| 6,303,035 B1 * | 10/2001 | Cote et al. .................. 210/636 |
| 6,547,968 B1 * | 4/2003 | Rabie et al. ................. 210/636 |
| 6,589,426 B1 * | 7/2003 | Husain et al. .............. 210/636 |

\* cited by examiner

METHODS FOR IMPROVING FILTRATION PERFORMANCE OF HOLLOW FIBER MEMBRANES

RELATED APPLICATIONS

This application claims priority from U.S. Patent Application No. 60/347,578, filed Jan. 9, 2002, the entire contents of which are hereby incorporated by reference herein.

FIELD OF THE INVENTION

The present invention relates to methods for treating hollow fiber membranes to improve the performance properties thereof. In one aspect, invention methods provide improved performance in hollow fiber filtration membrane modules. In another aspect, the present invention relates to methods for cleaning hollow fiber membranes. In yet another aspect, the invention relates to methods for increasing filtrate flow rate through a hollow fiber membrane.

BACKGROUND OF THE INVENTION

Hollow fiber membrane filtration modules are commonly used to separate solid components from a liquid containing those components. These filtration modules typically contain several bundles of hollow fibers which serve as the filtering element. The bundles are usually arranged uniformly around a hollow pipe so that liquid is filtered through the fibers and collected in the pipe for removal from the module.

Hollow fiber membrane filtration modules typically contain an outer housing having a longitudinal axis and raw inlet and outlet ends. The hollow pipe is generally located along the longitudinal axis of the outer housing and has a plurality of perforations for guiding filtered liquid from the module. A non-porous member is attached to each end of the outer housing to form a seal between the hollow pipe and the outer housing. The hollow fibers are arranged in an annular space formed between the hollow pipe and the outer housing. The fibers are secured by and penetrate through the nonporous members to form channels for raw liquid to pass through the module. The hollow fibers filter raw liquid by selectively passing liquid through their walls.

During operation of the filtration module, the pressure required to force the feedstock liquid through the hollow fiber membranes must be gradually increased. This occurs due to the accumulation of solids (i.e., fouling components) in the pores of the hollow fiber membrane. This accumulation of solids affects the duration of each processing cycle. Indeed, the duration of each processing cycle is determined by a variety of factors, such as, for example, type of fouling components, filtrate flow, recovery ratio, desired period between cleanings, and the like.

Various backwashing procedures have been developed to remove fouling components from hollow fibers. Backwashing generally involves forcing a liquid through the hollow fiber membranes, which dislodges solids entrapped within the membrane. The efficiency of backwashing procedures directly effects the overall efficiency of the filtration module. Accordingly, there is a continuing need for improved backwashing procedures for hollow fiber membrane filtration modules.

SUMMARY OF THE INVENTION

In accordance with the present invention, there are provided methods for improving performance of hollow fiber filtration membrane modules. Invention methods comprise unique backwashing procedures wherein the hollow fiber membranes within the module are pressurized with a gas on the lumen (i.e., feed) side at specified times during the backwash. Periodic use of invention methods keeps the membrane substantially free of fouling components thereby providing stable permeability and low trans-membrane pressures, which results in an efficient and economic filtration process.

In accordance with another aspect of the present invention, there are provided methods for cleaning hollow fiber membranes.

In accordance with yet another aspect of the present invention, there are provided methods for increasing filtrate flow rate through hollow fiber membranes.

In accordance with a further aspect of the invention, there are provided methods for quantitatively measuring the effectiveness of backwash procedures.

In accordance with a further aspect of the invention, there is provided a program product for operating backwash procedures.

DETAILED DESCRIPTION OF THE INVENTION

In accordance with the present invention, there are provided methods for improving performance of a filtration membrane module comprising a plurality of microporous hollow fibers, the method comprising subjecting the fibers to gas-assisted backwashing, wherein the gas-assisted backwashing removes fouling components from the fibers, thereby improving performance of the filtration membrane module.

As used herein, the phrase "gas-assisted backwashing" refers to a procedure whereby gas pressure is introduced on the lumen (feed side) of the hollow fibers. This generally expands the fibers and assists in dislodging fouling components entrapped within the hollow fiber membrane. For example, subjecting a typical hollow fiber membrane to a gas pressure of 15 psi results in an approximately 3% expansion of the fibers of a typical hollow fiber membrane.

In one embodiment, the gas-assisted backwashing comprises subjecting the fibers to
 a) forward flushing,
 b) bottom backwashing,
 c) top backwashing,
 d) soaking, and
 e) rinsing, wherein a gas pressurization stage is carried out before one or more of a), b), or e). While each stage a) through e) is generally performed in the sequence listed above, it is understood that the stages may be interchanged to optimize filtration depending on the particular application.

Figure 1:
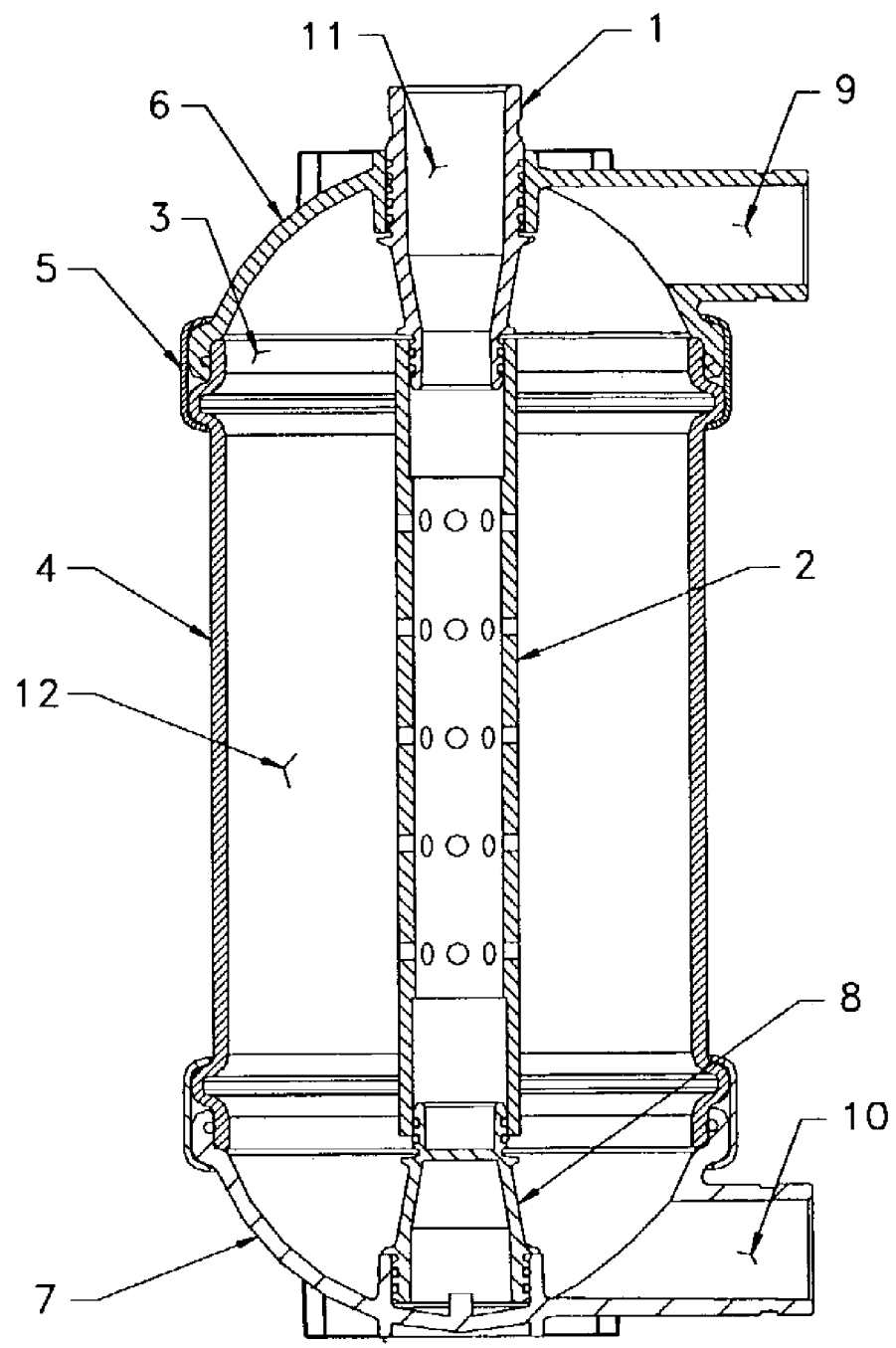
FIG. 1 is a schematic drawing of an exemplary hollow fiber membrane filtration module suitable for use in the practice of the present invention.

The invention gas-assisted backwashing is typically utilized in conjunction with a filtration membrane module such as that depicted schematically in FIG. 1. In FIG. 1, 1 refers to a product end adapter. This element serves as a connector between an outside pipe network system and the internal core tube where the filtrate flow collects from the filtrate compartment of the module. This element also seals the top feed space from the filtrate flow space via two O-rings. 2 refers to the core tube. This is typically a perforated pipe, which hydraulically connects the filtrate compartment to the product end port. 3 is the potting resin which is typically a polymeric resin that forms a seal between the ends of the hollow fiber membranes. In addition, the potting resin separates the feed flow connectors from the filtrate compartment. After the ends of the hollow fiber membranes are fixed in the potting resin, all of the lumens of the hollow fiber membrane remain clear and open. This allows water to flow to the feed/lumen side of the membrane but not to the filtrate side of the membrane. 4 refers to a shell which surrounds the fibers and provides pressure resistance on the overall module. The shell encapsulates the filtrate compartment which contains therein the hollow fiber membranes. 5 refers to a clamp that affixes each end cap to the shell. 6 refers to the ported end cap. This provides a connection between the top feed pipe and the hollow fiber membranes. 7 refers to the non-ported end cap. This provides a connection between the bottom feed pipe and the hollow fiber membranes. 8 is the bottom end cap. This separates the filtrate collecting core tube from the bottom feed line. 9 refers to the top feed/concentrate port. This is a component of the ported end cap. It provides a direct connection to the top feed flow. In addition, during forward flush, it provides a path for waste flow out of the module. 10 refers to the bottom feed port. This component is part of the non-ported end cap. It provides a direct connection to the bottom feed flow. During bottom backwash, it provides a path for waste backwash flow. 11 refers to the filtrate port. This component is part of the ported end cap. It provides a path for filtrate flow. During backwash or rinse, it provides a path for backwash flow. Finally, 12 refers to the hollow fiber membranes.

The following discussion of invention backwash cycles refers to "inside out" filtration, i.e., where raw liquid is introduced into the lumen side of the fibers and filtered through the fibers to the outer surface of the fiber. However, it is understood that invention backwash cycles may also be utilized with "outside in" filtration, i.e., where raw liquid is introduced on the outer surface of the fibers and filtered through the fibers to the lumen side.

During forward flushing, a liquid is introduced to the inside (lumen) of the fibers at a pressure sufficient to dislodge some of the solids accumulated on the inside surface of the fibers. During the first few seconds of the forward flush stage, the liquid flows into the lumen side of the fibers, effectively displacing air from the inside of the fibers. Liquids contemplated for use in the practice of the present invention include, for example, water. The duration of the forward flushing is typically in the range of about 1 second up to about 120 seconds. Preferably, the duration of the forward flushing is in the range of about 15 seconds up to about 40 seconds. Forward flushing typically is carried out at a pressure in the range of about 1 psi up to about 72 psi. Preferably, forward flushing is carried out at a pressure in the range of about 20 psi up to about 30 psi.

The liquid flow rate is usually high and approaches a linear flow rate inside the module of about 0.4 up to about 0.6 meter/second. Preferably, the flow rate is about 0.4 meter/second. For energy saving purposes, the flow rate can be lower. In some cases where system stability is more important than energy savings, higher flow rates may be utilized, i.e., from about 0.9 meters/second up to about 1.5 meters/second.

Figure 2:
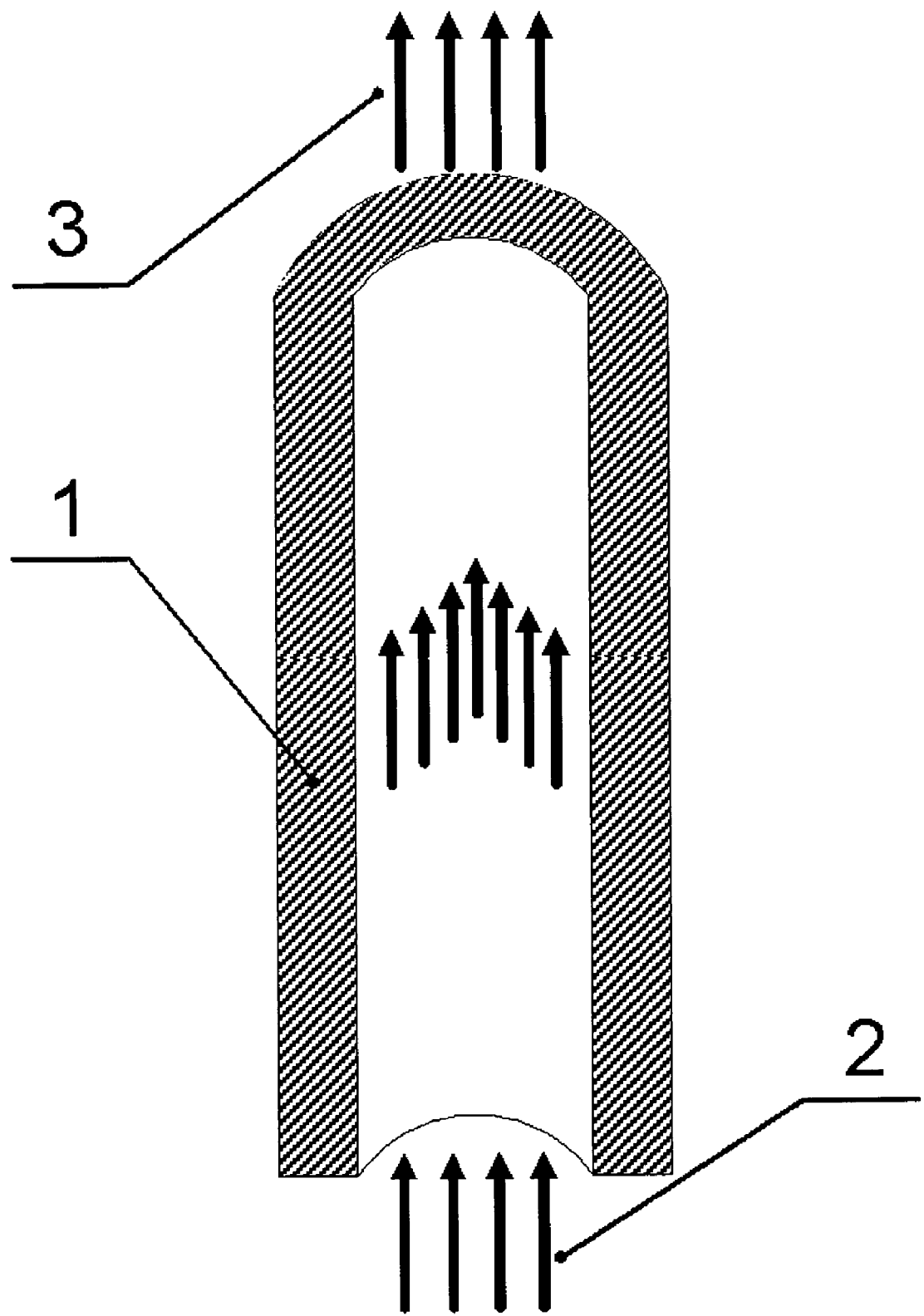
FIG. 2 illustrates the flow pattern through a hollow fiber membrane resulting from forward flushing during the invention backwash procedure.
Figure 3:
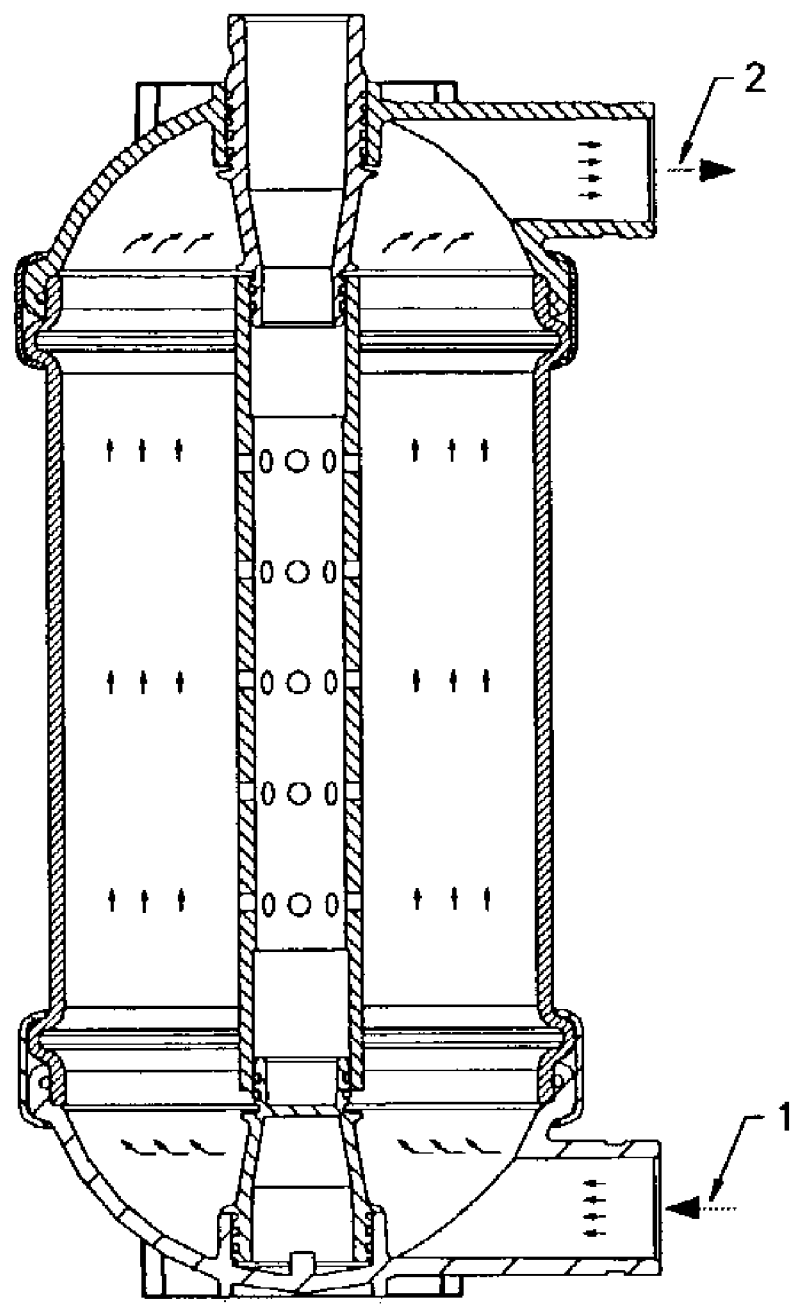
FIG. 3 illustrates the flow pattern through the entire module resulting from forward flushing during the invention backwash procedure.

FIG. 2 illustrates the flow pattern through a single hollow fiber membrane during the forward flushing stage of the invention backwash procedure. In FIG. 2, 1 represents a cross-sectional depiction of a hollow fiber membrane. Position 2 represents raw feed water flowing through the lumen side of the fibers and exiting the fiber at position 3. In addition, FIG. 3 illustrates the flow pattern through an entire module during the forward flush stage of the invention backwash procedure.

Figure 4:
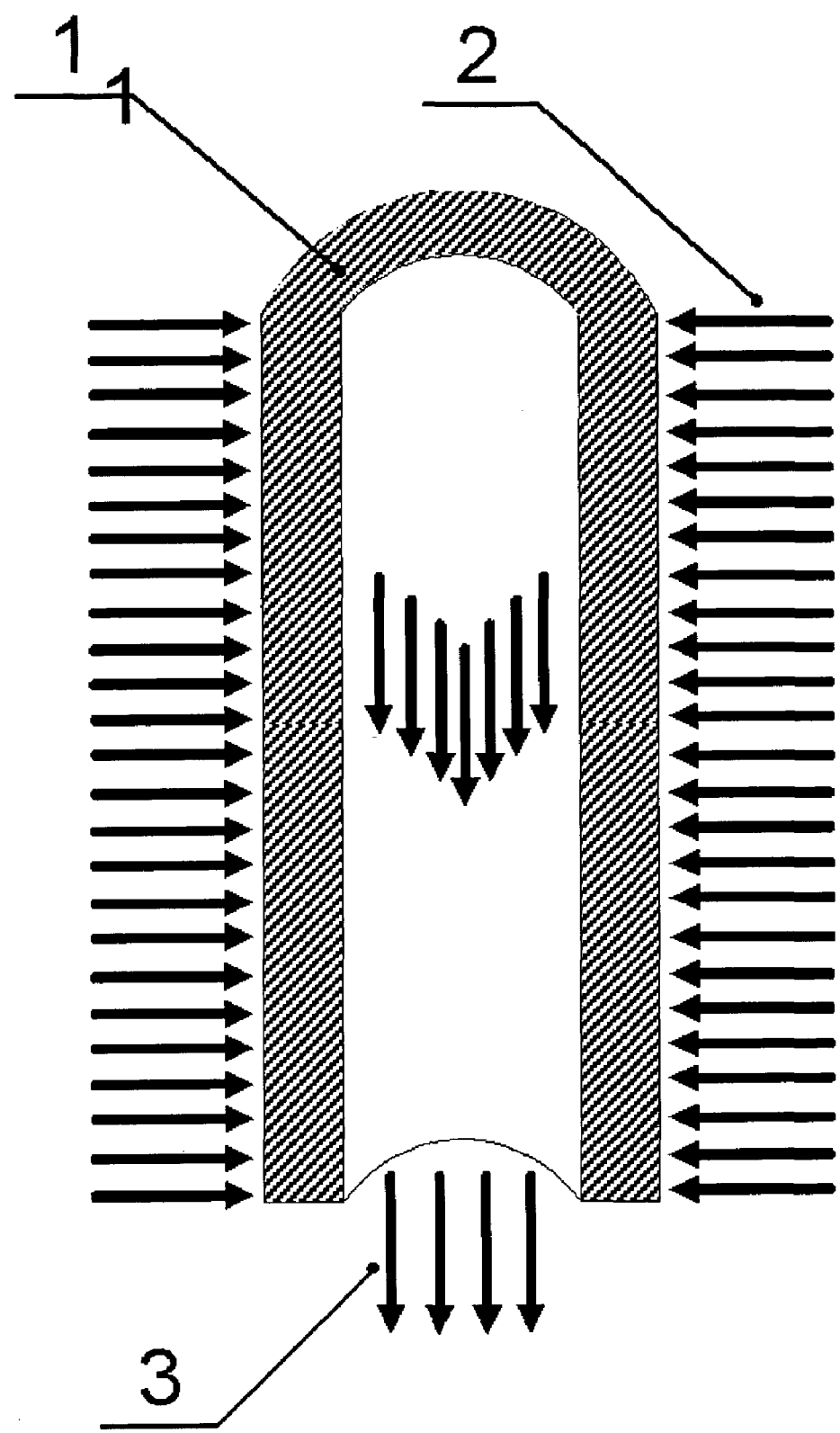
FIG. 4 illustrates the flow pattern through a hollow fiber membrane resulting from bottom backwashing during the invention backwash procedure.
Figure 5:
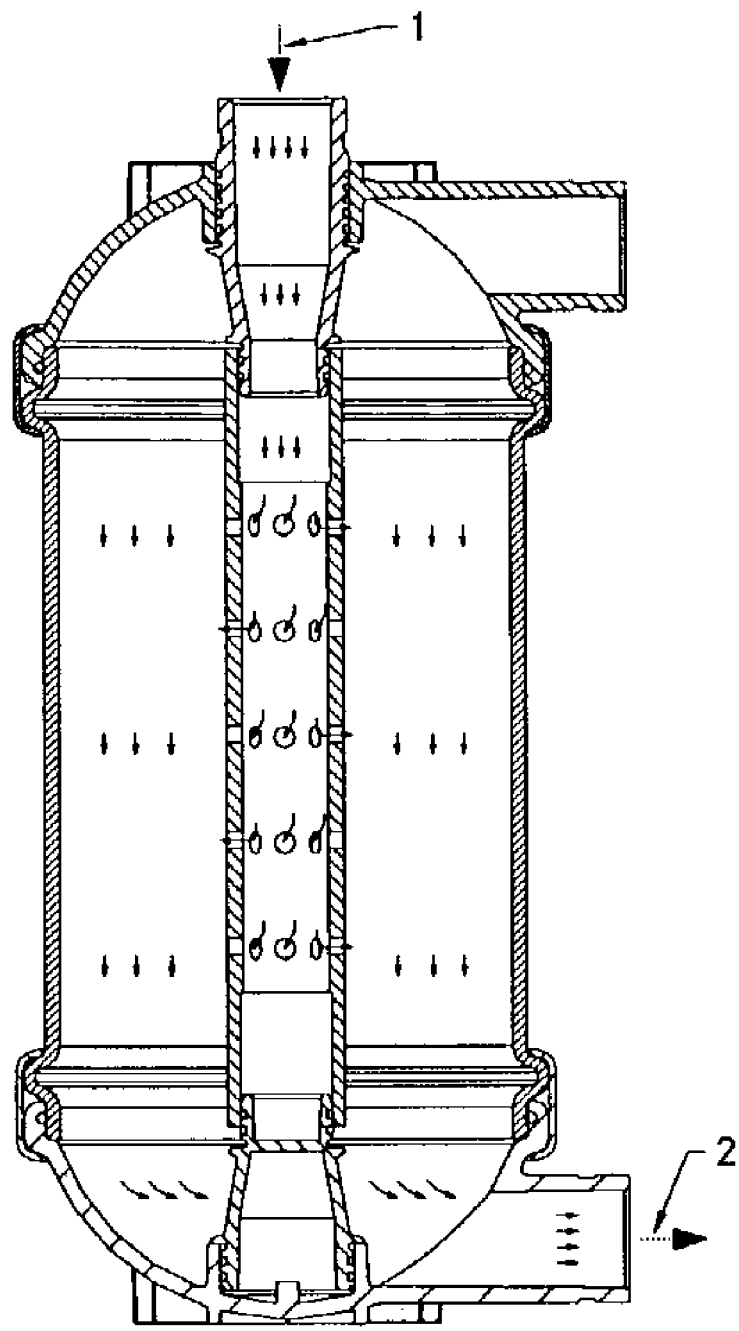
FIG. 5 illustrates the flow pattern through the entire module resulting from bottom backwashing during the invention backwash procedure.

Bottom backwashing typically involves simultaneously closing the top feed line of the membrane module while opening the bottom feed line of the module. A liquid (e.g., water) is transferred from the filtrate reservoir through the hollow fiber membrane, into the lumen, and finally to a waste disposal drain. The duration of bottom backwashing is typically in the range of about 1 second up to about 60 seconds. Preferably, the duration of bottom backwashing is in the range of about 5 seconds up to about 25 seconds. Bottom backwashing is typically carried out at a pressure in the range of about 1 psi up to about 72 psi. Preferably, bottom backwashing is carried out at a pressure in the range of about 30 psi up to about 40 psi. FIG. 4 illustrates the flow pattern through a hollow fiber membrane resulting from the bottom backwashing step during the invention backwash procedure. In FIG. 4, position 2 represents filtered fluid from a collection tank flowing through the hollow fiber membrane in the opposite direction from normal filtration mode. The fluid penetrates into the lumen side of the membrane and exits (indicated by position 3) the module at the bottom feed port. In addition, FIG. 5 illustrates the flow pattern through the entire module during bottom backwashing.

Figure 6:
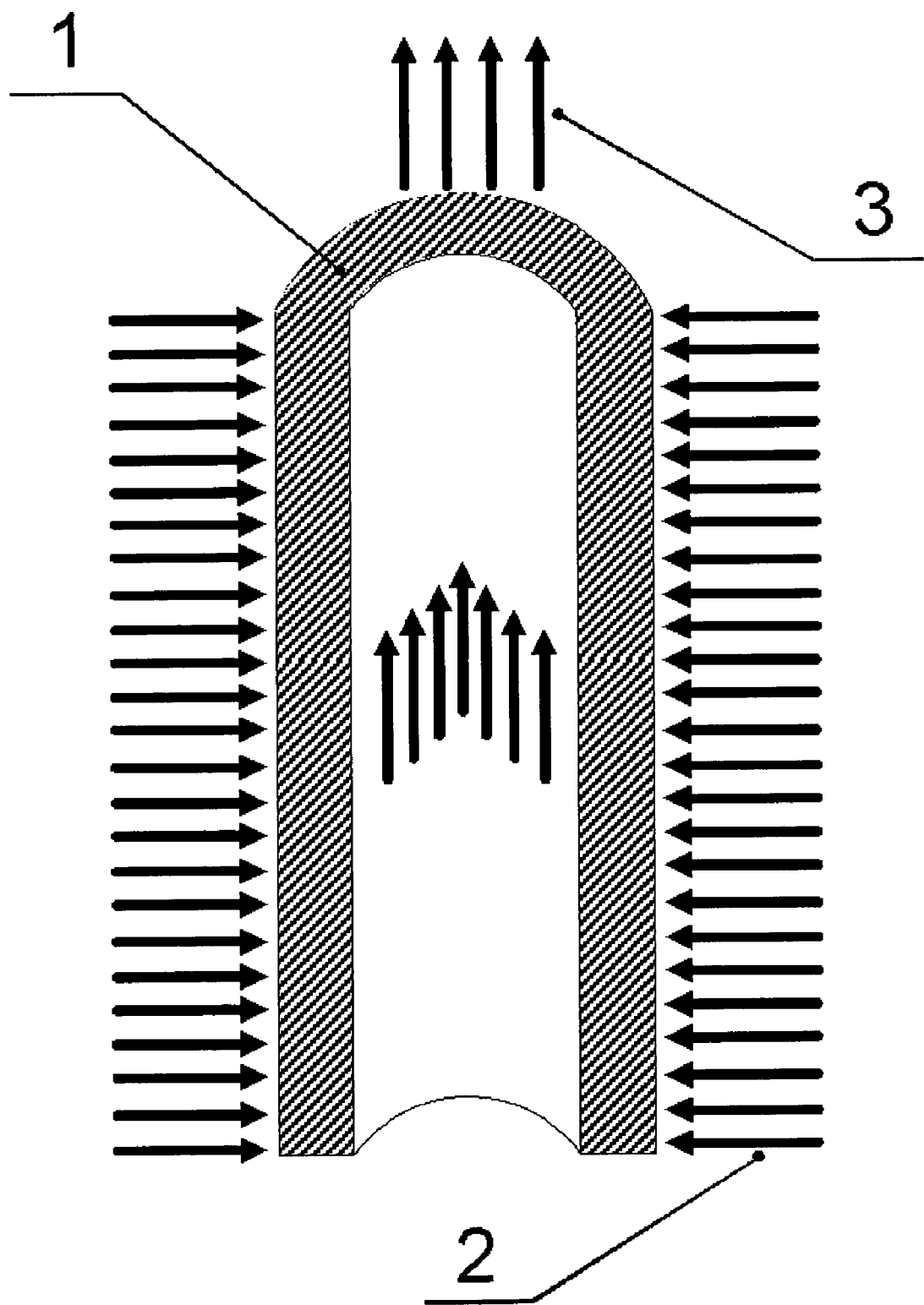
FIG. 6 illustrates the flow pattern through a hollow fiber membrane resulting from top backwashing during the invention backwash procedure.
Figure 7:
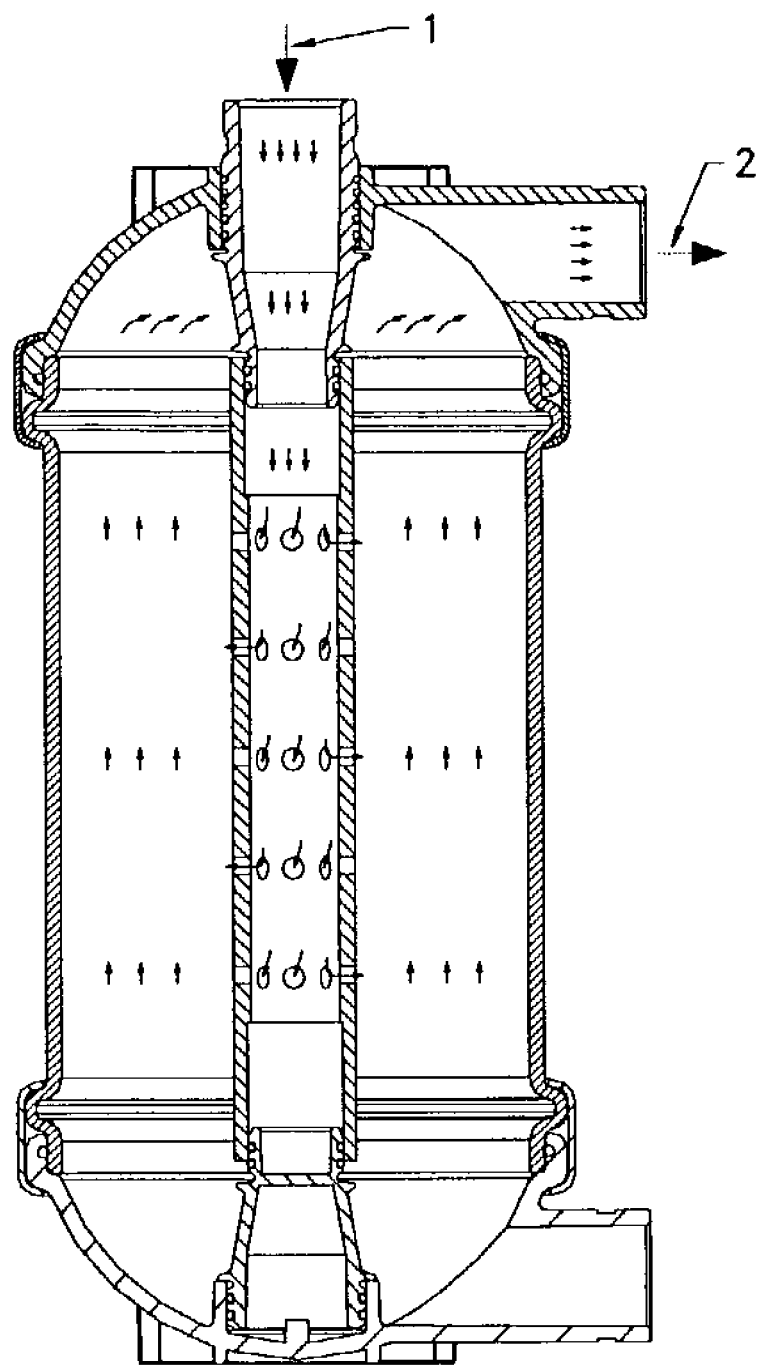
FIG. 7 illustrates the flow pattern through the entire module resulting from top backwashing during the invention backwash procedure.

Similarly, top backwashing typically involves simultaneously closing the bottom feed line of the membrane module while opening the top feed line of the module. A liquid (e.g., water) is transferred from the filtrate reservoir through the hollow fiber membrane, into the lumen, and finally to a waste disposal drain. The duration of top backwashing is typically in the range of about 1 second up to about 60 seconds. Preferably, the duration of top backwashing is in the range of about 5 seconds up to about 25 seconds. Top backwashing is carried out at a pressure in the range of about 1 psi up to about 72 psi. Preferably, top backwashing is carried out at a pressure in the range of about 20 psi up to about 30 psi. FIG. 6 illustrates the flow pattern through a hollow fiber membrane resulting from the top backwashing step during the invention backwash procedure. In FIG. 6, position 2 represents filtered fluid from a collection tank flowing through the hollow fiber membrane in the opposite direction from normal filtration mode. The fluid penetrates into the lumen side of the membrane and exits (indicated by position 3) the module at the top feed port. In addition, FIG. 7 illustrates the flow pattern through the entire module during the top backwash step of the invention backwash procedure.

Soaking of the hollow fibers is typically carried out following the bottom and top backwashing stages. Soaking is accomplished by closing all valves on the module and stopping all pumps. A disinfectant is typically introduced into the module for about 1 second up to about 900 seconds. Preferably, the disinfectant remains in the module for about 30 seconds up to about 120 seconds. Disinfectants contemplated for use in the soaking step include for example, about 10% up to about 50% aqueous solutions of hydrogen peroxide, citric acid, hydrochloric acid, sulfuric acid, phosphoric acid, and the like. The pressure inside the module during soaking is typically in the range of about 0 psi up to about 15 psi. Preferably, soaking is carried out at a pressure in the range of about 0 psi up to about 5 psi.

Figure 8:
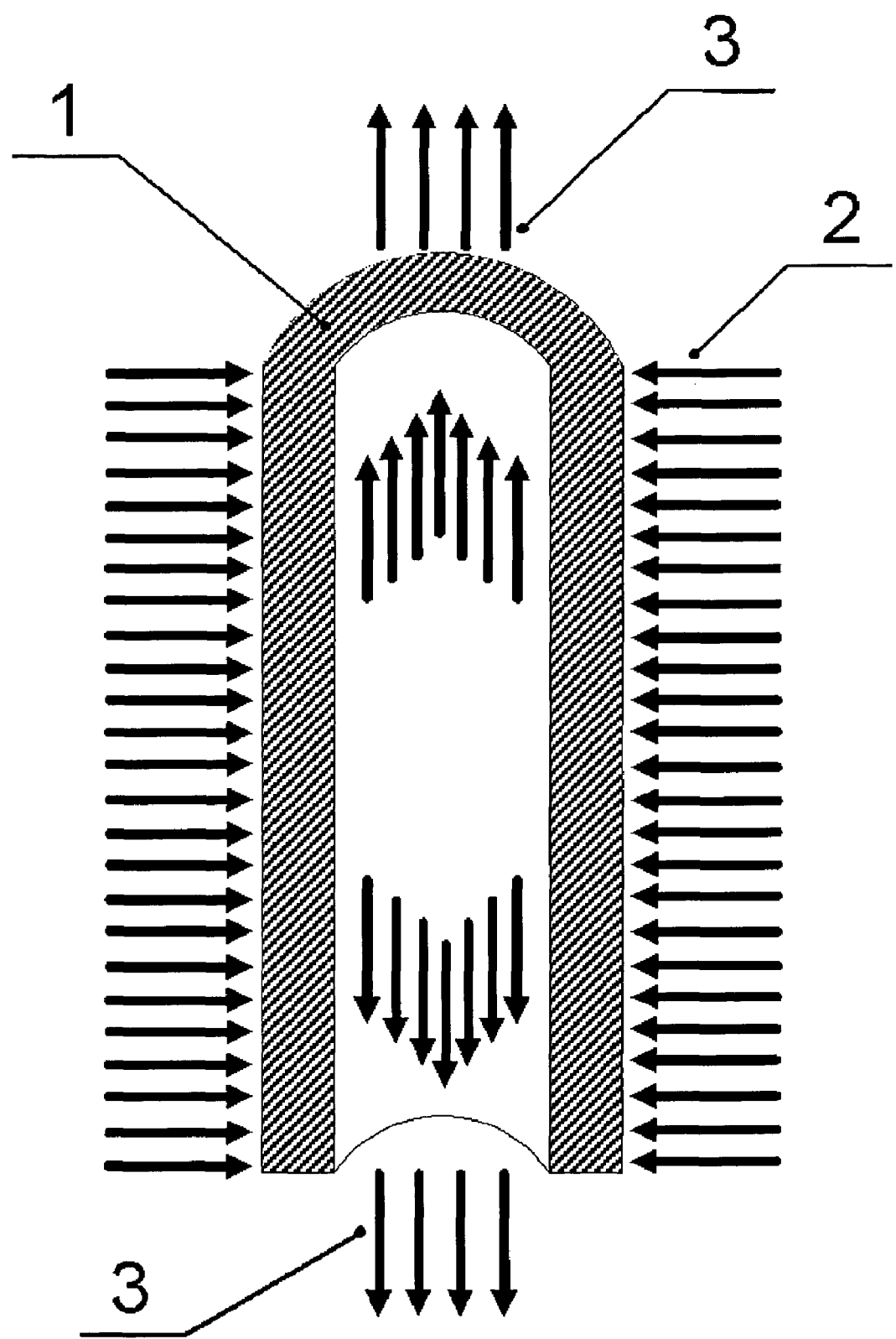
FIG. 8 illustrates the flow pattern through a hollow fiber membrane resulting from the rinse stage of the invention backwash procedure.

Rinsing is typically carried out following soaking and is accomplished as follows. The top and bottom feed lines are opened as well as the drain valve so that all of the liquid remaining in the module from the soak flows out of the module to the drain. The backwash supply line is then opened and the backwash pump is turned on. Water from the filtered water tank is passed through the hollow fiber membranes and is drained through both the bottom feed line and the top feed line. The duration of the rinse is typically in the range of about 1 second up to about 120 seconds. Preferably, the duration of said rinsing is in the range of about 5 seconds up to about 25 seconds. Rinsing typically occurs at a pressure in the range of about 1 psi up to about 72 psi. Preferably, rinsing occurs at a pressure in the range of about 30 psi up to about 40 psi. FIG. 8 illustrates the flow pattern through a hollow fiber membrane resulting from the rinse step during the invention backwash procedure. In FIG. 8, position 2 represents the direction of flow of filtered water during rinse. The filtered water flows through the hollow fiber membrane in the opposite direction to normal filtration mode. The water penetrates into the lumen side of the membrane and exits the module through both the bottom and top feed ports.

Gas pressurization can be performed one or more times during the backwash and is typically carried out before either forward flushing, bottom backwashing, or rinsing. Gas pressurization is accomplished by draining the bottom lumen side of the hollow fibers while simultaneously introducing gas (e.g., air) into the top lumen side of the fibers. Gas pressurization is typically carried out at a pressure in the range of about 1 psi up to about 50 psi. Preferably, gas pressurization is carried out at a pressure in the range of about 15 psi up to about 20 psi. Generally, higher pressure is desired to provide fiber expansion. Fiber expansion assists in dislodging fouling components. The duration of gas pressurization is typically in the range of about 5 seconds up to about 300 seconds. Preferably, the duration of gas pressurization is in the range of about 20 seconds up to about 60 seconds. However, for optimum performance, the gas pressurization should not persist long enough to dry the membrane. Rapid release of the gas pressure at the end of this time period provides additional force for dislodging fouling components, facilitating removal of these components during following backwash steps.

Figure 9:
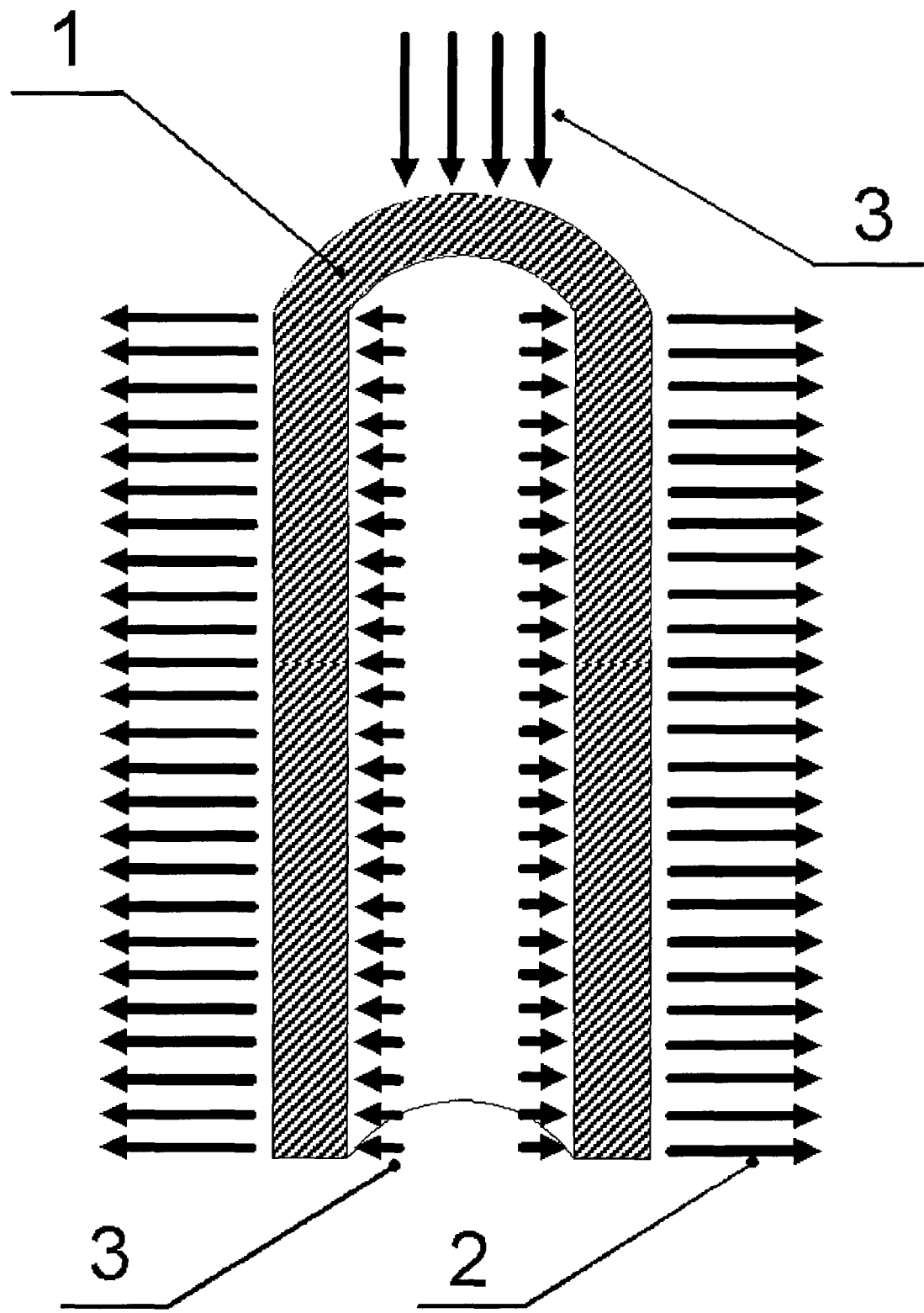
FIG. 9 illustrates the flow pattern through a hollow fiber membrane resulting from gas pressurization during the invention backwash procedure.
Figure 10:
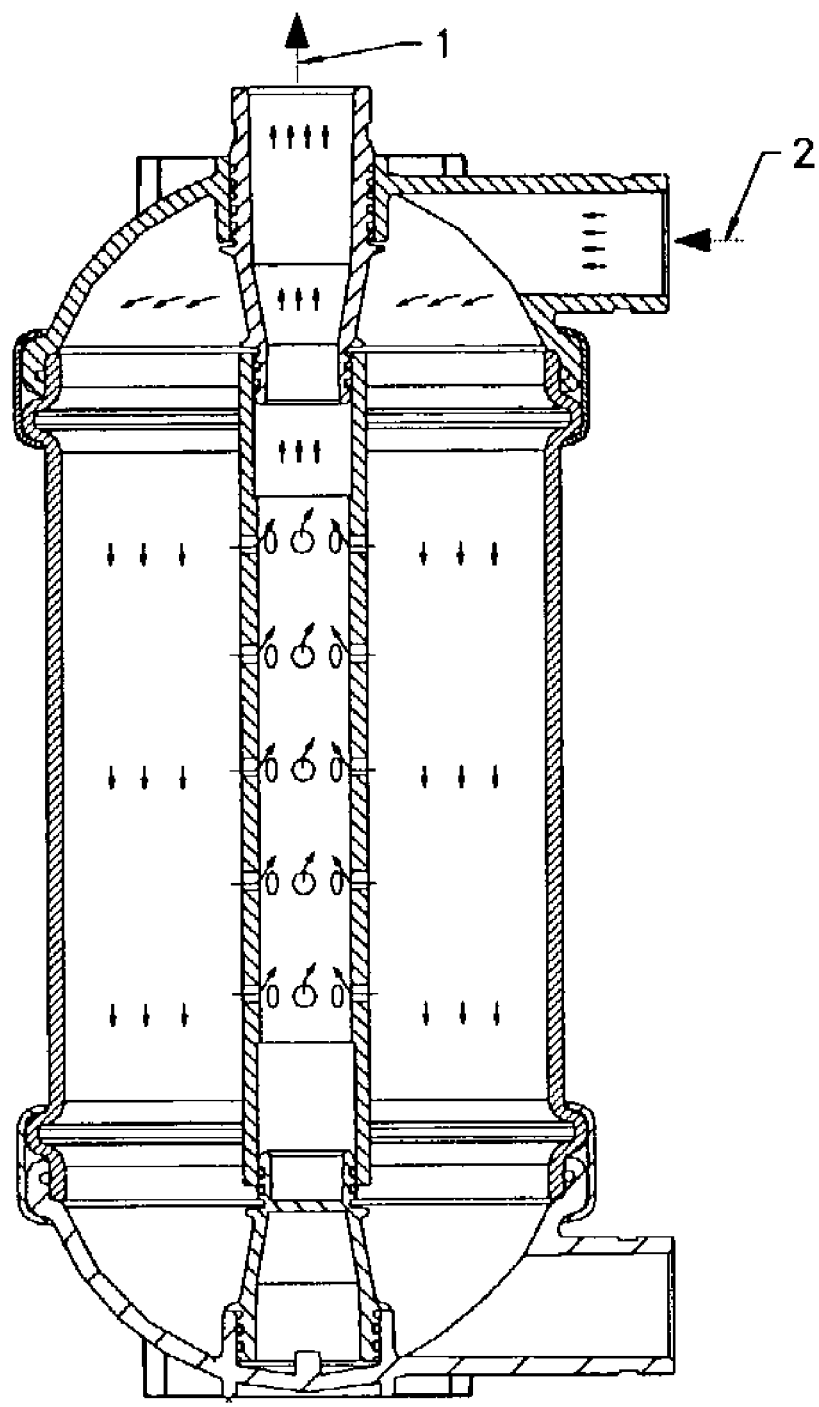
FIG. 10 illustrates the flow pattern through the entire module resulting from gas pressurization of the invention backwash procedure.

FIG. 9 illustrates the flow pattern through a hollow fiber membrane resulting from gas pressurization during the invention backwash technique. As shown in FIG. 9, position 3, gas pressure is introduced on the lumen side of the hollow fiber membrane and driven out through the hollow fiber (position 2). The liquid embedded in the pores of the hollow fiber membrane is subject to significant capillary force. The term "bubble point pressure" is typically used to refer to the pressure required to overcome the capillary forces in a pore and displace liquid from the pore. Since the gas pressure is typically less than the bubble point pressure (which, for a HYDRAcap® hollow fiber membrane is typically about 200-250 psi), the gas is unable to displace water from the hollow fiber membrane pores. Thus, the gas pressure displaces feed water on the lumen side and then passes this same water through the membrane and out of the fiber into the filtrate compartment. FIG. 10 illustrates the flow pattern through the entire module during gas-pressurization.

The pressure and duration of gas pressurization may vary depending on the type of application which the module is servicing. For example different time and pressure parameters may be required for well water treatment compared to seawater treatment.

In another aspect of the invention, there are provided methods for determining the effectiveness of a backwash procedure. In one embodiment, such determination may be accomplished, for example, by employing a sensor unit which is installed on the top feed line and the bottom feed line. The feed lines are composed of transparent material for use in this aspect of the invention. The sensor unit comprises a radiation emitter and a radiation acceptor. The emitter is attached to one side of the transparent feed line and produces monochromatic or multi-spectrum radiation. In a preferred embodiment, the emitter produces radiation in the visible range of the electromagnetic spectrum. On the other side of the feed line is attached the radiation acceptor. The acceptor measures the intensity of radiation produced by the emitter, wherein the emitted radiation passes through the transparent feed line and the liquid stream before arriving at the acceptor. The difference in radiation intensity during backwash cycles relative to filtered liquid provides a quantitative measure of the amount of solids exiting the module during that particular backwash cycle, thereby providing a measurement of the effectiveness of a backwash cycle. The results thus obtained are then used to adjust the parameters of the gas-assisted backwash process to increase the efficiency of the backwash cycle.

In a further aspect of the invention, there is provided a program product for backwashing a hollow fiber membrane comprising a) forward flushing,
b) bottom backwashing,
c) top backwashing,
d) soaking, and
e) rinsing, wherein a gas pressurization stage is carried out before one or more of a), b), or e). The program product also has the ability to measure flow rates and trans-membranes pressures for each of a), b), c), and e). In addition, the program product has the ability to independently adjust the duration of each of a), b), c), and e), in order to achieve maximum efficiency of the backwash process.

Appendices A and B provide detailed information on the program product, including program commands, variables, input data, a block diagram illustrating the specific steps controlled by the program product, and the like. An extended description of the manipulations and/or decisions contemplated by each of the blocks of the block diagram set forth in Appendix B follows:

In Block No. 1, the user inputs the preferred parameters for the system, which preliminarily determine the initial start up state of the system. The remaining parameters are derived from information about the current plant configuration, or are selected so as to limit the changes during the optimizations. The terms referred to in this block are defined as follows:

Initial Processing Time—the time between two backwashes, when filtrate water is being produced (measured in seconds).

Initial Desired Recovery—system recovery calculated for a single processing cycle (measured in percentages). This value eventually will change during the optimization period.

Minimum allowed recovery—this is a limiting value that implements the desired minimum volume stream of filtrate water available for use (measured in percentages). Since the optimization process decreases recovery, this parameter determines the degree one must trade off stable performance versus high productivity.

Flux—the specific load on the membrane. The amount of filtrate water produced from a fixed area of membrane for a fixed amount of time (measured in gallons per square feet per day). This value corresponds to moment filtrate flow out of the membrane system.

Desired Time Between Chemical Cleanings—also referred to as "Processing Period". This is the time between two off-line cleanings (measured in days). Current practice in the United States usually sets this time between 20 and 90 days.

Membrane Module Active Area—a fixed parameter that provides the active area of membrane per single module (measured in square feet).

Membrane modules in the unit—refers to the number of membrane modules attached to the system.

CEB Frequency—the frequency of chemical enhanced backwashes (CEB). This term also refers to how many regular backwashes separate two chemical enhanced backwashes.

$FF_{max}$—maximum time duration for Forward Flush step (measured in seconds). Since this time parameter changes during the optimization process, the maximum value provides a practical upper limit, which is useful to prevent over adjusting this parameter.

$BWB_{max}$—maximum time duration for Backwash Bottom step (measured in seconds). This value is similar to $FF_{max}$ and also serves to set an acceptable limit to prevent over adjusting.

$BWT_{max}$—maximum time duration for Backwash Top step (measured in seconds). This value provides a limit similar to $BWB_{max}$ and $FF_{max}$.

$RINSE_{max}$—maximum time duration for Rinse step (measured in seconds).

This value provides a limit similar to $BWT_{max}$, $BWB_{max}$ and $FF_{max}$.

In Block No. 2, the amount of filtrate water produced in a single processing cycle is calculated. The coefficient 1440 converts 24 hours into minutes. The Active Area is equal to Membrane Module Active Area.

In Block No. 3, the combined amount of water used for a single backwash process is calculated. Most of the water is sourced from filtrate reserve, however, a small portion thereof is taken from feed (Forward Flush step).

In Block No. 4, which contains two steps, the first step involves performing a simple test to determine how much time is needed for that step, along with the amount of water required for this step. The need for a practical test is explained as follows:

The prior forward flush (FF) is usually accomplished by air pressurization.

During that step, the water is displaced out of the fiber lumen. The fibers are only wet, but not yet full with water. When FF begins, pressurized air is released very quickly down through the backwash waste line. At substantially the same moment, the feed pump begins to supply feed water into the lumen side of the fiber, and begins to fill the fiber lumen. Depending upon the module type, the volume needed to refill the element is about 7 gallons. The top feed manifold also needs to be refilled, which adds about 1-3 gallons per element. Depending on the speed of developing the desired FF flow, as well as the actual amount of water needed, there is some amount of time needed to fill the system with water and provide flow out of the module. This time has to be considered by preliminary determination of the forward flush duration, and also measuring the initial amount of forward flush water discharged out of the system.

The above-described test is carried out only once as part of the initial start up of the system, unless there is no change in feed flow, or valve logic does not need an update. The second step involves putting these two values in the control system as inputs from the operator.

In Block No. 5, the volume of filtrate water needed for a single backwash process is calculated. Filtrate water is used from the following steps—Backwash Top, Backwash Bottom and Rinse.

In Block No. 6, 40% of all filtrate water used in single backwash is separated for the Rinse step. The value of 40% is taken based on the fact that the Rinse step is usually performed by opening both outlets from the membrane element, and flow is slightly higher compared to backwash bottom and backwash top step. By using substantially equal durations, the rinse step requires a bit more water compared to BWB and BWT.

In Block No. 7, the volume of water used for backwash bottom step is calculated. Since 40% of the filtrate water for backwash is already separated for the rinse, this step takes half of the residue—30%.

In Block No. 8, the backwash top volume is assigned as being substantially equal to the backwash bottom volume.

In Block No. 9, the time needed for the backwash top step is calculated based on the known volume for displacing. Here the backwash flux is maintained constant (190 gfd), based on the results of preliminary studies.

In Block No. 10, the backwash bottom time is assigned as substantially equal to the backwash top time. In the same block, the rinse time is assigned as well.

In Block No. 11, the system is ready to start and can be started when desired.

Block No. 12, the system starts in processing mode, skipping all backwash steps.

In Block No. 13, Block 12 is repeated for clarity in view of the need to transition to the next page.

In Block No. 14, a control system using built-in transmitters measures and records the transmembrane pressure (TMP) at two minutes after backwash. This time is needed to equalize the filtrate flow after backwash, as well as to stabilize TMP value. Here and later the following initials are used:

Subscript letter "a" is used to indicate that a value is taken after backwash.

Subscript letter "b" is used to indicate that a value is taken before backwash.

Subscript letter "k" is used to indicate the discrete moment of time between the beginning of two consecutive processing cycles. Since the ultra filtration system works in sequence mode, separated by a fixed period of time (Processing→Backwash→Processing), each cycle containing Processing and Backwash can be looked at as a discrete moment of time. The value of "k" is used to indicate the current cycle, which is occurring right now. In the same way, the "k−1" moment of time is the past period, and the "k+1" is the next future moment. After executing the current cycle, i.e., time is consumed, the next cycle becomes the current and the current becomes the past. This way past and future data can be addressed and recognized properly.

In Block No. 15, the transmembrane pressure is measured and recorded just at the end of the current processing cycle.

In Block No. 16, the undertakes the first backwash process with initial times.

In Block No. 17, the number of backwashes between which a minimum increase of transmembrane pressure change is going to be sensed is calculated ($NB_{\Delta TMPsens}$). In this equation, the following parameters are used:

ΔTMP—is the minimum confident value of transmembrane pressure that can be sensed by the control system. This parameter is limited by transmitter sensitivity, signal/noise level and analog bit resolution on the digital controller unit. For regular industrial grade systems, this value can be as low as 0.1 psi (pound per square inch).

$TMP_{ini}$—is the average transmembrane pressure measured in the first processing cycle, measured in psi (pounds per square inch).

$$TMP_{ini} = \frac{TMP_{a[k]} + TMP_{b[k]}}{2}$$

Processing time—time between two backwashes in minutes. Available from Block 1.

Processing Period—this is the Desired Time Between Chemical Cleanings available from Block 1.

In Block No. 18, the value in real data format from Block 17 is converted into integer data format. Real data format can not be used because the number of backwashes is only a whole number. Once the value is determined, the control system creates a stack with length equal to $NB_{\Delta TMPsens}$. Since this moment the values for $TMP_{a[k]}$ for the next $NB_{\Delta TMPsens}$ number of backwashes will be stored in separate cells. This way a data history will be available for TMP in the past period with length of $NB_{\Delta TMPsens}$ number of backwashes.

In Block No. 19, the system goes to the second regular backwash.

In Block No 20, the system measures and records the values for turbidity at the end of each particular backwash step/cycle. The system has two sensors—one on the top feed manifold and one on the bottom feed manifold. The values are as follow:

$NTU_{TOP\_FEED\_FF}$—the turbidity in the top feed manifold at the end of the forward flush step;

$NTU_{BOTTOM\_FEED\_BWB}$—the turbidity in the bottom feed manifold at the end of the backwash bottom step;

$NTU_{TOP\_FEED\_BWT}$—the turbidity in the top feed manifold at the end of the backwash top step;

$NTU_{RINSE}$—the average turbidity in the top and bottom feed manifolds at the end of rinse step;

In Block No. 21, the system automatically returns into processing mode.

In Block No. 22, the transmembrane pressure is measured two minutes after beginning on the current processing cycle. The two minute delay is needed for flow and pressure equalization after backwash in order to take representative data.

Block No. 23 presents a logical statement, comparing whether the TMP in the current cycle is bigger than the summary between TMP measured $NB_{\Delta TMPsens}$ number of cycles ago and the minimum confident value of transmembrane pressure that can be sensed from the control system. In other words, this is the increment of TMP for a fixed number of cycles that has to be kept constant in order to meet the required processing period (time between two off-line chemical cleanings).

Clearly, the system has to wait for $NB_{\Delta TMPsens}$ number of cycle prior checking the statement in Block No. 23. First the stack needs to be filled with real plant data for TMP. Shortly thereafter, the statement will have real source of information for proper compare. One record is being taken once every processing cycle.

Block No. 24 presents a logical statement similar to that made in Block No. 23. The difference is only in the moment of time. In order to eliminate random noise, the system checks the tendency of increase on the TMP in the past discrete cycle. The result of this block is basically the same as for Block No. 23, where the system goes to optimization on backwash sequences.

In Block No. 25, the system is seen to go to the next cycle without any action related to optimization, i.e., TMP increases even though the time is lower than desired.

Block No. 26 illustrates that the system is allowed to go into the process of optimization on the backwash sequences.

In Block No. 27, the previous block is repeated for clarity of presentation.

In Block No. 28, a loop that puts recorded turbidities in order of their value is summarized. The variables used are as follows:

NTUBW_END—a vector containing all four values for turbidity recorded during the backwash process (see Block No. 20).

MAX$_i$—a generic name for a function that finds and puts in order of values the component from a vector.

Block No. 29 presents a logical statement. The first element in the vector MAXNTU (MAXNTU$_1$) has the highest value from all four components. The last element from the vector MAXNTU (MAXNTU$_4$) has the lowest value. This block checks whether NTU$_{TOP\_FEED\_FF}$ is the highest value between all recorded turbidities.

In Block No. 30, the current values for time duration on three different backwash cycles are changed. Thus, the time duration of the FF cycle is increased and the time duration on the cycle that has lowest turbidity (as well as on the next smallest thereafter) is decreased.

Block No. 31 presents a logical statement similar to that in Block No. 29.

Block No. 32 is a block similar to Block No. 30, the difference being only in the variables (backwash sequence durations) considered in that block.

Block No. 33 is a logical statement similar to that in Block No. 29.

Block No. 34 is similar to Block No. 30, the difference being only in the variables (backwash sequence durations) considered in that block.

Block No. 35 is similar to Block No. 30, the difference being only in the variables (backwash sequence durations) considered in that block.

Block No. 36 follows the results from previous blocks (i.e., Block Nos. 29-35). This block contains only illustrative and transition functions indicating the main purpose of the following blocks on same page (page D).

In Block No. 37, the new volume for backwash is calculated. Since the backwash sequences have been just changed, the volume of water consumed for a single backwash process might be different. The difference will manifest as unequal flow through each step, as well as rearranged duration of the individual steps.

In Block No. 38, the expected new recovery is calculated. The new recovery will depend on the change of the backwash effluent volume per single backwash process.

Block No. 39 is only illustrative of function, indicating the overall purpose of the following blocks.

Block No. 40 is a logical statement. The block checks whether the maximum limit for the backwash top time has already been reached.

Block No. 41 is a logical statement block similar to Block No. 40, the difference being in the argument only.

Block No. 42 is a logical statement block similar to Block No. 40, the difference being in the argument only.

Block No. 43 is a logical statement block similar to Block No. 40, the difference being in the argument only.

Block No. 44 is also a logical statement block. The block checks whether the maximum limit for recovery has been reached.

In Block No. 45, new values calculated for backwash sequences are transferred internally into main variables used for actual control of the backwash sequence duration.

Block No. 46 is semi-illustrative, wherein only one of the backwash sequences is being changed to its max limit value. Only those sequences that exceed the pre-determined maximum value (and this is only one) will be adjusted. The rest will not need to be adjusted because they will be less than its max limit value.

Block No. 47 is illustrative only, indicating the function of all the blocks that follow. Block Nos. 48-54 are activated only when the system goes trough Block No. 46, i.e., the backwash step optimization is completed. See page G (Block Nos. 60-68) for more details.

Block No. 48 is a logical statement, which checks whether optimization of the backwash sequences is completed.

Block No. 49 is identical to Block No. 48.

Block No. 50 is a logical statement, comparing whether the TMP in the current cycle is bigger than the sum of TMP measured NB$_{\Delta TMPsens}$ number of cycles ago and the minimum confident value of transmembrane pressure that can be sensed from control system. In other words, this is the increment of TMP for a fixed number of cycles that has to be kept constant in order to meet required processing period (time between two off-line chemical cleanings). The statement is equal to that used from Block No. 23.

Block No. 51 is a logical statement similar to Block No. 50, the difference being that compared values are shifted one cycle back in time, compared to the variables used in Block No. 50.

Block No. 52 is a logical statement similar to Block No. 50, the difference being that compared values are shifted two cycles back in time compared to the variables used in Block No. 50.

Block No. 53, the duration of the processing time is increased in fixed small increments, thereby increasing recovery.

Block No. 54 is semi illustrative, indicating transition between the portion of algorithm where processing time is being upgraded and the rest of the algorithm where time sequencing for backwash is being performed. From this block the algorithm ends its action for the current cycle (except the case of feed quality upset) and waits for the next backwash.

Block No. 55 is illustrative only, indicating the function of the entire block below on the same page (i.e., Block Nos. 56-59).

Block No. 56 is a logical statement, which checks whether the TMP in the current cycle is bigger than the sum of TMP measured NB$_{\Delta TMPsens}$ number of cycles ago and protective pressure constant (here 1 psi—pounds per square inch is illustrated).

Block No. 57 is a logical statement, which checks whether the TMP in the current cycle is bigger than the sum of TMP measured past cycle and protective pressure constant (here 0.5 psi—pounds per square inch is illustrated).

Block No. 58 indicates system action of initiating immediate backwash process. The backwash is called irregular because it happens at non regular moments of time (about two minutes after beginning of the processing cycle). This backwash is made in order to clean the membrane system and compensate increased fouling speed over the membrane.

Block No. 59 indicates that the system continues its normal processing performance until processing time is consumed and the next regular backwash process is due.

Block No. 60 is illustrative of the initiation of the algorithm. Block Nos. 60-68 illustrate the overall sequence of the algorithm and system processing actions. The system starts at Page A, Block 1, and is ready for execution.

In Block No. 61, the system goes into processing mode. Page B continues execution.

In Block No. 62, the system goes into backwash mode (see page B, Block Nos. 16-26).

In Block No. 63, the steps set forth on pages C and D (through Block No. 39) are performed.

Block No. 64 summarizes Block Nos. 40-46 (see page D).

Block No. 65 is a logical statement. The goal is to insure the existence of at least a small net increment for TMP throughout time since, if there is no such increment, than the function of Block Nos. 23 and 24 practically disappears. It is desired to maintain adjustments in some acceptable balance between high fouling conditions (checked in Block Nos. 23 and 24) and non-fouling conditions (the latter of which actually do not allow the membrane system to express its physical nature). The process of fouling is an important element of the invention process for optimization of backwash sequences. Thus, even the occurrence of very low levels of fouling is verified by this block. It is up to the experience of the operator to set the initial parameters in Block No. 1 in such a way so that from the very beginning of the process, even low levels (but still measurable) of fouling occur in the system. This small increment of TMP (corresponding to the occurrence of fouling) is the smallest pressure value which can be technically measurable with high accuracy (pounds per square inch). Based on currently available technology in the industry, this limit is presently about 0.1 psi. Thus, as illustrated in this block, the net value of 0.1 psi is chosen as the increment.

Block No. 66 refers to the processing illustrated on page E.

Block No. 67 refers to the processing illustrated on page F.

Block No. 68 indicates the moment of time when trans membrane pressure approaches the maximum allowed value and the system needs to be stopped for off line chemical cleaning.

Invention methods are useful in conjunction with single module operation or for very large scale multi-module operation. Invention methods provide high flow rates and recovery ratios with minimal fouling for extended periods of operation.

The invention will now be described in greater detail by reference to the following non-limiting examples.

EXAMPLE 1

The following example illustrates a detailed procedure and the results obtained thereby employing the invention backwash procedure comprising air pressurization as an independent backwash stage. A goal of this study was to illustrate the effectiveness of the invention backwash procedure by utilizing the procedure in complete runs with raw surface water. Specifically, the present study examined the following five aspects of the filtration process:

1. Test fouling ratio by varying the steps of invention backwash procedures.
2. Compare the invention backwash technique with previously utilized backwash procedures.
3. Optimization of invention backwash procedure.
4. Determination of proper adjustment of invention backwash procedure.

The test water used in this Example originated as raw Colorado River water from the U.S. Bureau of Reclamation Yuma Desalting Plant at the USA/Mexico border. The following modules were used in this study:

HYDRAcap® 60-DWI with an effective active membrane area of 420 square feet.

The experimental protocol for this Example is outlined as follows:

1. Connect unit to raw feed water line containing water from the Colorado River.
2. Attach a single HYDRAcap module to the pilot module.
3. Begin processing and adjust backwash sequences according to a preliminary schedule or according to determination by operating personnel. The preliminary schedule is shown in Table 1, run nos. 1 and 2.
4. Observe first incoming regular backwash process, paying particular attention to the transparent piece of pipe connecting both feed sides of the module.
5. Evaluate effectiveness of each backwash step. An operator can readily determine the efficiency of each backwash stage by observing the relative amount of solids which exit the module after each backwash stage.
6. Once next processing cycle begins, adjust the backwash sequence according to evaluation from past backwash processes.
7. Repeat step 3 through 6 two times.
8. Allow the system to operate until it fouls.
9. Perform chemical cleaning.
10. Begin next run with modified backwash sequences.
11. Adjust system as described in 3 through 6.
12. Allow the system to operate until it fouls.
13. Perform chemical cleaning.
14. Do comparison run without using air in the backwash process.

Table 1 presents a summary of the data from this analysis. As shown in Table 1, four different filtration runs were performed. Only the first two runs were preliminary scheduled. The other two runs were performed based on the results from the first two runs and on projections as to what the optimum processing conditions might be. Each run was carried out using constant flux and constant sequence duration. Adjustment of the backwash sequences was made during the first 2-3 hours of operation. After this time, the membrane module was allowed to foul under control of the pilot unit, with constant processing parameters.

Run no. 1 utilized one air pressurization after a 30 minute processing time; a flux of 58.3 gallons/square foot/day (gfd); a recovery of 89.7%; and chlorination with every backwash with 4.5 ppm active chlorine prior soak.

Run no. 2 represents a typically recommended backwash sequence. The recovery was 94.6%, flux 68.5 gfd and processing time duration was 40 minutes. No air pressurization was used.

Run no. 3 utilized air pressurization with a modified rinse. Instead of a rinse, a top backwash was used. Top backwash was performed to increase the linear flow rate inside the lumen after being oxidized with chlorine. In this run, the recovery was increased to 94.3%, flux was raised to 68.5 gfd and processing time duration was prolonged to 40 minutes.

Run no. 4 was optimized after reviewing the data from the previous runs. In this run, two air pressurizations were carried out—one before forward flush and one during soak. Similar to run no. 3, top backwash was used during rinse. In addition, for run no. 4, the backwash bottom time was doubled. The rest of the parameters were the same as run no. 3.

TABLE 1

| YUMA AIR REINFORCED TEST SUMMARY | | | | |
|---|---|---|---|---|
| Run # | 1 | 2 | 3 | 4 |
| Start machine hour | 2915.4 | 3135.7 | 3173.6 | 3237 |
| End machine hour | 2993.4 | 3172 | 3236.1 | 3516.8 |
| Operating hours duration | 78 | 36.3 | 62.5 | 279.8 |

TABLE 1-continued

YUMA AIR REINFORCED TEST SUMMARY

| Run # | 1 | 2 | 3 | 4 |
|---|---|---|---|---|
| Air pressurization step? | YES | NO | YES | YES[2] |
| Processing Time duration [sec] | 1800 | 2400 | 2400 | 2400 |
| Backwash steps duration | | | | |
| Air [sec] | 38 | 0 | 40 | 40 |
| Forward Flush [sec] | 33 | 9 | 18 | 15 |
| Backwash Bottom* [sec] | 6 | 12 | 6 | 12 |
| Backwash Top* [sec] | 6 | 12 | 6 | 6 |
| Backwash Top/Bottom* [sec] | 0 | 0 | 0 | 0 |
| Soak [sec] | 60 | 60 | 60 | 60 |
| Final Flush-Top/Bottom [sec] | 24 | 15 | 25 | 20 |
| Total Backwash Time [sec] | 129 | 108 | 115 | 113 |
| Active Chlorine Concentration [ppm] | 4.5 | 4.5 | 4.5 | 4 |
| BW Pump Flow [gpm] | 60 | 60 | 60 | 60 |
| Forward Flush Flow [gpm] | 30 | 30 | 30 | 30 |
| Chlorine frequency, every XX bw | 1 | 1 | 1 | 1 |
| Citric Acid dosage, pH XX | 0 | 0 | 0 | 0 |
| Citric acid CEB every BW | 0 | 0 | 0 | 0 |
| Air in the Forward Flush | NO | NO | NO | NO |
| Alternate Feed Direction | NO | NO | NO | NO |
| Total cycle time (sec) | 1929 | 2508 | 2515 | 2513 |
| % Time-production | 93.3% | 95.7% | 95.4% | 95.5% |
| % Time-FF to drain | 1.7% | 0.4% | 0.7% | 0.6% |
| % Time-BW to drain | 1.9% | 1.6% | 1.5% | 1.5% |
| % Time-Chlorine soak | 3.1% | 2.4% | 2.4% | 2.4% |
| Total | 100.0% | 100.0% | 100.0% | 100.0% |
| FLOWS | | | | |
| Filtrate Flow Rate [gpm] | 17 | 20 | 20 | 20 |
| Recirc Flow Rate [gpm] | 0 | 0 | 0 | 0 |
| Production per cycle step [gallons] | | | | |
| Filtered water | 510 | 800 | 800 | 800 |
| FF + BW to Drain | 52.5 | 43.5 | 46 | 45.5 |
| Net: | 457.5 | 756.5 | 754 | 754.5 |
| % Recovery | 89.7% | 94.6% | 94.3% | 94.3% |
| Backwash source | UF Filtrate | UF Filtrate | UF Filtrate | UF Filtrate |
| Comments | quick fouling | Quick fouling | stability | zero fouling |

*Denotes Chlorine/Citric acid addition

Several conclusions can be drawn from the data presented in Table 1. First, the data demonstrates that air pressurization alone does not provide system stability. Backwash is complex process. Indeed, only after achieving optimum effectiveness of each backwash step can an equilibrium between filtered and backwash fouling matter be found. Second, it is evident that a second system adjustment is beneficial after 12-24 hours of processing. Adequate time is needed to accumulate an adequate amount of solids to allow evaluation of which backwash stage is most beneficial and how much must be changed to optimize the backwash.

Analysis of Water Turbidity

Feed water turbidity during each of the runs was very stable. However, a change in seasons between run no. 1 and run no. 2 dropped turbidity from an average of 7 nephelometric turbidity units (NTU) down 2.5-4.0 NTU. An average water turbidity of 3.0 NTU was observed for run nos. 2-4.

Figure 11:
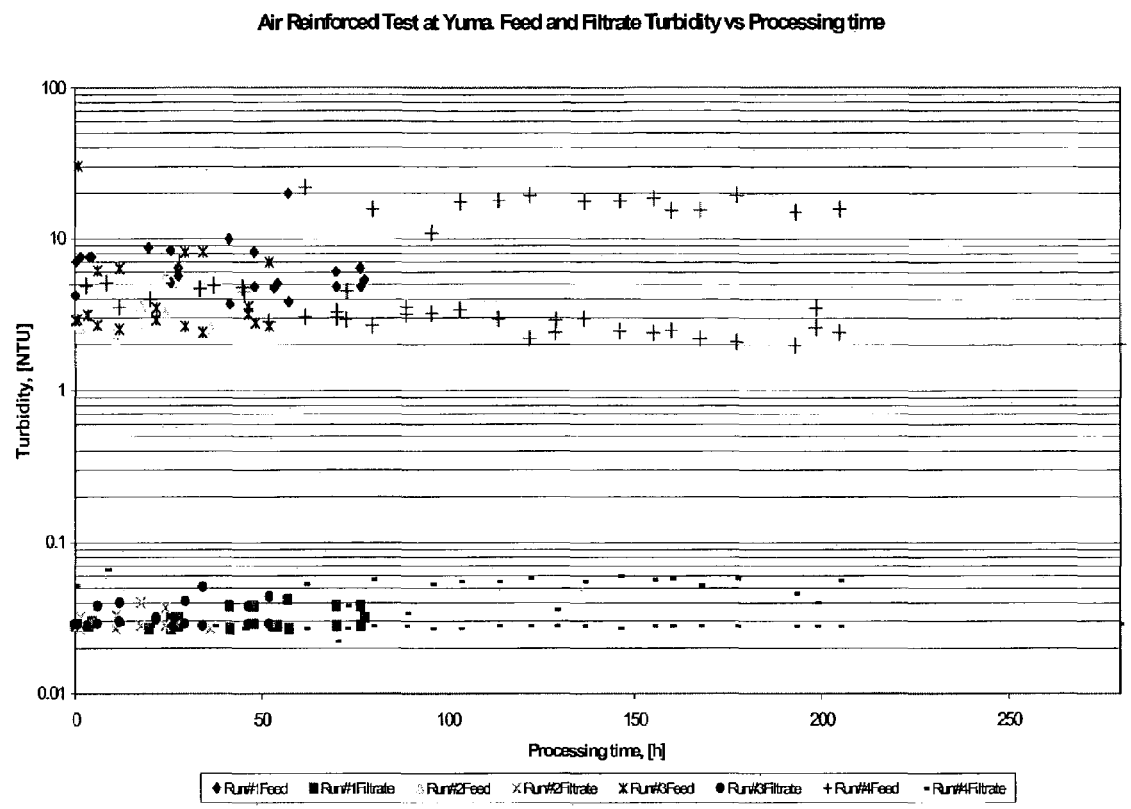
FIG. 11 illustrates feed and filtrate turbidity vs. processing time for an in service test of invention backwash procedure.

The sampling point for feed water turbidity is next to the bottom feed valve manifold, at a position close to the bottom feed line on the module. Due to a strong and effective backwash process, a significant amount of solids accumulate into the feed turbidity sensor during the backwash process. This causes NTU spikes to appear in the data spreadsheets for a period of 4-10 minutes after backwash. When interpreting data for feed turbidity on each particular run, two sets of data are compared. One set represents values after backwash and the other set represents values prior to backwash. Only the latter set should be taken as the true feed water turbidity value. FIG. 11 illustrates water turbidity during each run.

Filtrate Flux

Figure 12:
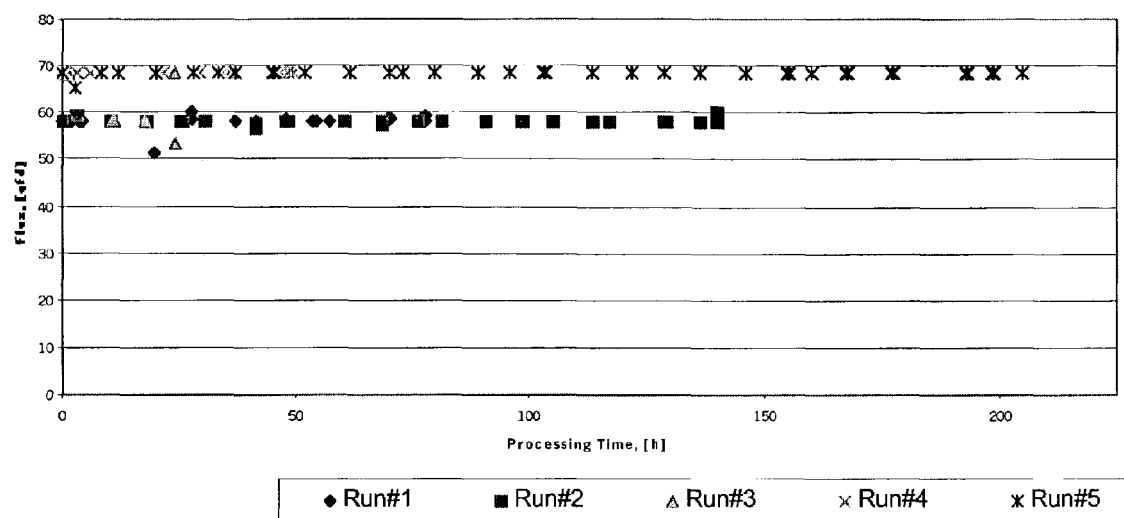
FIG. 12 illustrates filtrate flux vs. processing time for an in service test of invention backwash procedure.
Figure 13:
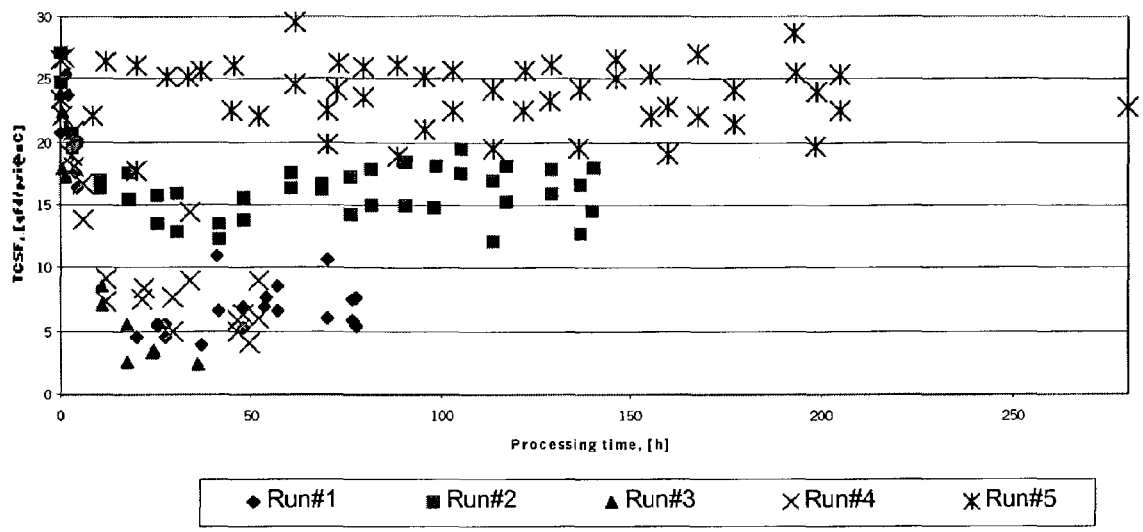
FIG. 13 illustrates temperature compensated permeability vs. processing time for an in service test of invention backwash procedure.

Flux was constant during each run. However, due to an operator error in run no. 4, the flux was lowered to 58 gfd for 50% of the time. FIG. 12 illustrates the filtrate flux for each run.

Permeability

Run no. 2 was the shortest run due to rapid fouling. This result demonstrates that a conventional backwash process is unable to maintain stable permeability for a long period of time. Run no. 4 was the most stable regarding system permeability. This run clearly demonstrates that the invention backwash process maintains stable permeability for longer periods of time, thus increasing the efficiency of the entire filtration process.

Permeability Restoration after Manually Activated Backwash

Figure 14:
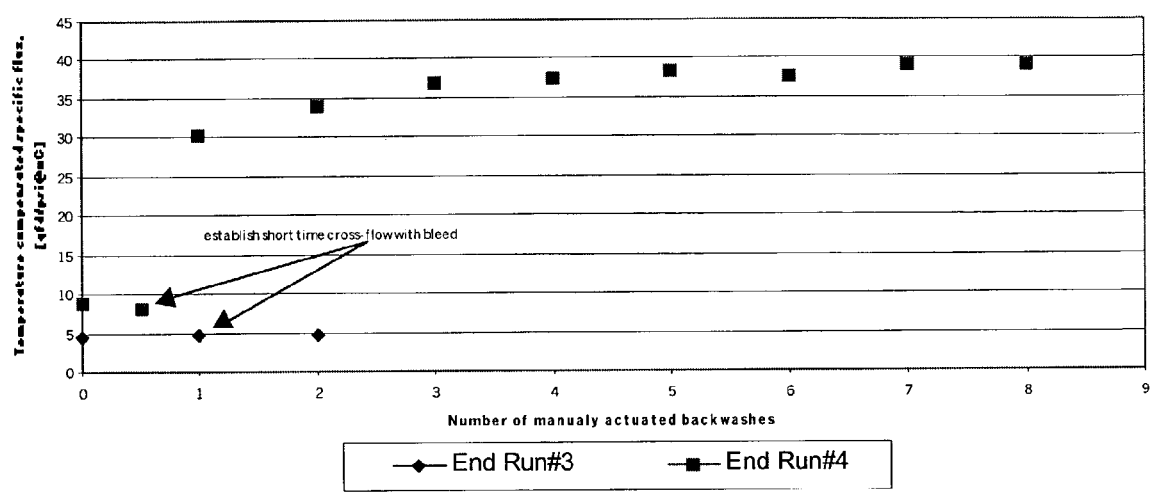
FIG. 14 illustrates membrane permeability restoration after manually activated backwashes.

During this study, it was decided to test the efficiency of manually activated backwashes at the end of run nos. 2 and 3. The goal was to determine the efficiency of the invention backwash process and whether the recovery is too high. First the system was switched into crossflow for 2-3 minutes with 70 gallons per minute (gpm) cross flow rate and 10 gpm bleed. Next, the cross flow was discontinued and a backwash was initiated. The backwash was carried out using an air pressurization stage prior to the regular backwash stage. The air pressure was 15 psi for a total duration of 40 seconds (35 seconds to achieve a pressure of 15 psi, followed by a 5 second hold at that pressure). As shown in FIG. 14, after the typical backwash process (run no. 2), the invention backwash process did not result in membrane permeability restoration. However, after run no. 3, the invention backwash process comprising air pressurization (i.e., run no. 4) restored membrane permeability rapidly and completely. This demonstrates that fouling remained completely reversible.

EXAMPLE 2

The following example illustrates data from real implementation of the algorithm described herein. The goal for this test was to demonstrate functionality and performance characteristics of ultrafiltration systems under the control of a control unit that utilizes exact principles of that algorithm. The following goals are illustrative:

1. To design and construct a pilot unit furnished in such a way as to be able to execute the algorithm.
2. Using Ladder Logic to write a computer program that implements the algorithm.
3. To run the system in real conditions and record data.

The pilot unit was constructed using standard HYDRANAUTICS processing flow diagram but modified in order to measure on-line the turbidity in the bottom feed and top concentrate line. For measuring turbidity, transmitter model WQ710 (Global Water Instrumentation Inc., 11257 Coloma Road, Gold River, Calif. 95670) has been used. Transmitters are placed in high turbulence positions in the pilot pipe layout in order to maximize sensing of the turbidity changes. The pilot unit is equipped with programmable logic controller (PLC) Modicon Micro 612 (Schneider Automation-AEG, USA).

The unit is designed to support up to two HYDRAcap60 modules each of them having 500 ft$^2$ (square feet) membrane active area. Elements are of the hollow fiber type with inside-out filtrate flow pattern.

The test was conducted on territory of La Salina Waste Water Treatment Plant (1330 Tait St., Oceanside Calif. 92054). The feed water for the unit was taken out of the main secondary effluent stream from the plant. This water was treated upstream of the point of take-out by classic waste water treatment technology including:

Grid Settling→Coagulation→Sedimentation→Biological Activated Sludge Basin→Sedimentation with Partial Sludge Recirculation.

The feed water to HYDRAcap Pilot Unit is effluent from above mentioned process and has the following water analysis:

TABLE 2

| Constituent | Value | Dimensions |
|---|---|---|
| pH | 7.9 | — |
| TSS | 12.0 | mg/l |
| VSS | 12.0 | mg/l |
| % VSS | 96 | % |
| Active Cl | 0 | mg/l |
| Turbidity | 3.2 | NTU |
| CBOD | 5.4 | mg/l |
| Ca | 65 | mg/l |
| Mg | 37 | mg/l |
| Na | 197 | mg/l |
| NH$_4$ | 38 | mg/l |
| HCO3 | 260 | mg/l |
| SO4 | 210 | mg/l |
| Cl | 350 | mg/l |
| SiO2 | 210 | mg/l |
| PO4 | 2 | mg/l |
| TOC | 9.2 | mg/l |
| TDS | 1367 | mg/l |

To translate the algorithm into PLC, standard Ladder Logic instructions (available for Modicon Micro family products), were used. The software for programming is LMODSOFT v. 3.1. The entire program consists essentially of about 90 networks. The complete program in the PLC comprises two parts:

Part 1. Implements the standard control function, and does not implement the new algorithm. That part is taken out from other pilot units and is slightly modified in order to meet the difference in components on the pilot unit. That portion of the software is NOT a part of the present invention. This portion of the program comprises 28 networks.

Part 2. Entirely new program written for first time, which implements the new algorithm. This portion of the program comprises about 60 networks.

As the first step, the algorithm requests the following parameters as information for the system:

1. Initial Processing Time=20 minutes. This time was chosen based on experience with secondary waste water effluents. Usually this time varies between 20 and 30 minutes for this type of water source.
2. Initial Desired Recovery—85%. This value was chosen based on past pilot scale experience with such type of water.
3. Minimum Allowed Recovery—75%. This value was chosen based on common acceptance for ultra filtration system performance.
4. Flux—26 gfd (gallons per square feet).
5. Desired Time Between Chemical Cleanings—25 days.
6. Membrane Module Active Area—500 ft$^2$ (square feet).
7. Membrane Modules on the Unit—2.
8. CEB Frequency—1.
9. ForwardFlush$_{max}$—20 s (seconds). This value is chosen in order to prevent the system from excessive backwash sequence adjustments.
10. BackwashBottom$_{max}$—20 s (seconds). This value is chosen in order to prevent the system from excessive backwash sequence adjustments.
11. BackwashTop$_{max}$—20 s (seconds). This value is chosen in order to prevent the system from excessive backwash sequence adjustments.

12. $Rinse_{max}$—20 s (seconds). This value is chosen in order to prevent the system from excessive backwash sequence adjustments.

The following additional parameters were then adjusted in the system:
1. Backwash Flux—132 gfd (gallons per square feed per day). This value is lower than usually recommended. Backwash flux is limited by the maximum backwash flow from the pump, available on the pilot skid.
2. No chemicals are used during the backwash. This requirement is imposed in order to determine the speed and affect of bio-fouling on the system.
3. Ferric Chloride Dose—1 mg/l (milligram per liter) measured as $FeCl_3$. This chemical is used as coagulant in order to limit fouling potential of the feed water.
4. Initial duration of the backwash sequences—20 s (seconds). All backwash sequences which are subject to change in the algorithm were adjusted to 20 s (seconds).
5. Backwash screen inlet filter time—5 sec (seconds).
6. Soak Time—5 sec (seconds). A short duration for this variable is chosen because chemicals are not used during the backwash steps in this Example.
7. Maximum Trans Membrane Pressure allowed for single processing cycle—1.5 psi (pound per square inch).
8. Moment of time to record TMP—2 minutes after backwash.
9. Time delay for on-line turbidity recording—500 msec (milliseconds). This time is chosen experimentally in order to have maximum confident value from the sensors.

The unit was started and the following data where observed and recorded.

Figure 15:
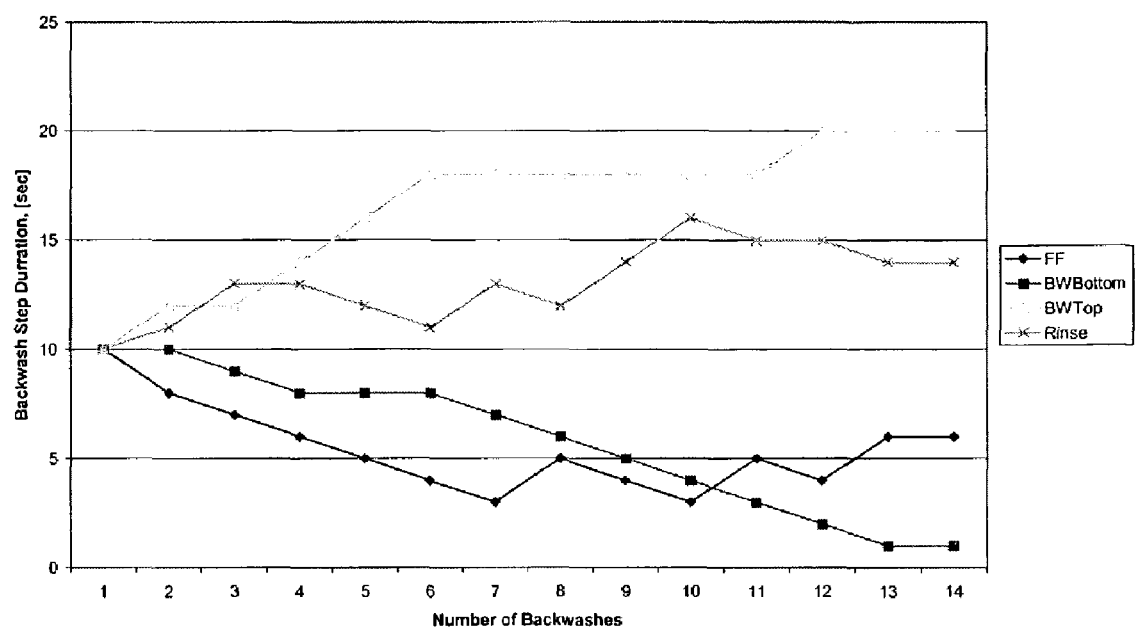
FIG. 15 illustrates the backwash step duration as a function of processing time for the test run described in Example 2.

According to the invention algorithm, the PLC first calculated minimum transmembrane pressure increment. The value of 0.15 psi was recorded during the second processing period. After the first processing cycle, according to algorithm, the PLC began adjustments on the duration of the backwash sequences. Table 3 summarizes the recorded values. All data were recorded three minutes after the end of the backwash process. FIG. 15 graphically illustrates the relationship between backwash step duration and processing time.

TABLE 3

| Machine Time | Number Backwash | TMP, [psi] | FF, [sec] | BWB [sec] | BWT [sec] | Rinse, [sec] | Flux, [gfd] |
|---|---|---|---|---|---|---|---|
| 633 | 2 | 1.35 | 10 | 10 | 10 | 10 | 26.2 |
| 633.3 | 3 | 1.33 | 8 | 10 | 12 | 11 | 26.3 |
| 633.6 | 4 | 1.39 | 7 | 9 | 12 | 13 | 26.5 |
| 634.3 | 5 | 1.34 | 6 | 8 | 14 | 13 | 26.2 |
| 634.6 | 6 | 1.40 | 5 | 8 | 16 | 12 | 26.6 |
| 635.0 | 7 | 1.39 | 4 | 8 | 18 | 11 | 26.4 |
| 635.3 | 8 | 1.40 | 3 | 7 | 18 | 13 | 27.3 |
| 635.6 | 9 | 1.39 | 5 | 6 | 18 | 12 | 26.6 |
| 639.0 | 10 | 1.37 | 4 | 5 | 18 | 14 | 26.0 |
| 640.2 | 11 | 1.34 | 3 | 4 | 18 | 16 | 25.9 |
| 640.5 | 12 | 1.35 | 5 | 3 | 18 | 15 | 25.9 |
| 640.8 | 13 | 1.40 | 4 | 2 | 20 | 15 | 26.2 |
| 641.1 | 14 | 1.36 | 6 | 1 | 20 | 14 | 26.1 |
| 641.4 | 15 | 1.36 | 6 | 1 | 20 | 14 | 26.6 |

NOTE: Trans Membrane Pressure was recorded directly from specially installed transmitter.

After approaching the value of 20 seconds for one of the backwash cycles, the backwash steps optimization discontinued. After that the system was left to work overnight without recording the data. On the next day it was found that processing time rose up to 45 minutes and stabilized. The machine time at that moment was 662.0 h, i.e., for period of 20 hours the processing time increased from 20 minutes up to 45 minutes. Some where within this time period (641.4-662.0 h) the system went out of recovery optimization process, when TMP increment between two consecutive backwashes exceeded previously calculated limit of 0.15 psi.

For a period of one week the unit operated with constant processing conditions—constant time sequences durations, relative constant feed water quality. Filtrate flux was maintained virtually constant as well. As a result transmembrane pressure climbed with marginal level. At the end of the first week, temperature compensated transmembrane pressure was already 11 psi, which does not need any off-line chemical cleanings.

Figure 16:
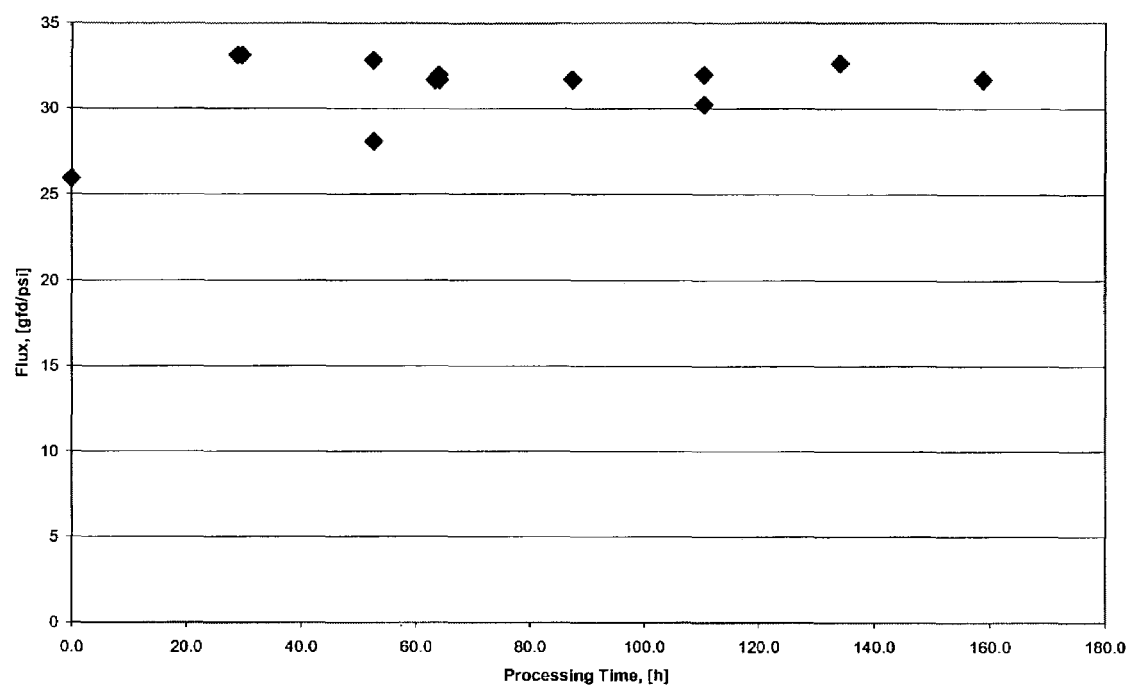
FIG. 16 illustrates flux stability verses processing time for the test run described in Example 2.
Figure 17:
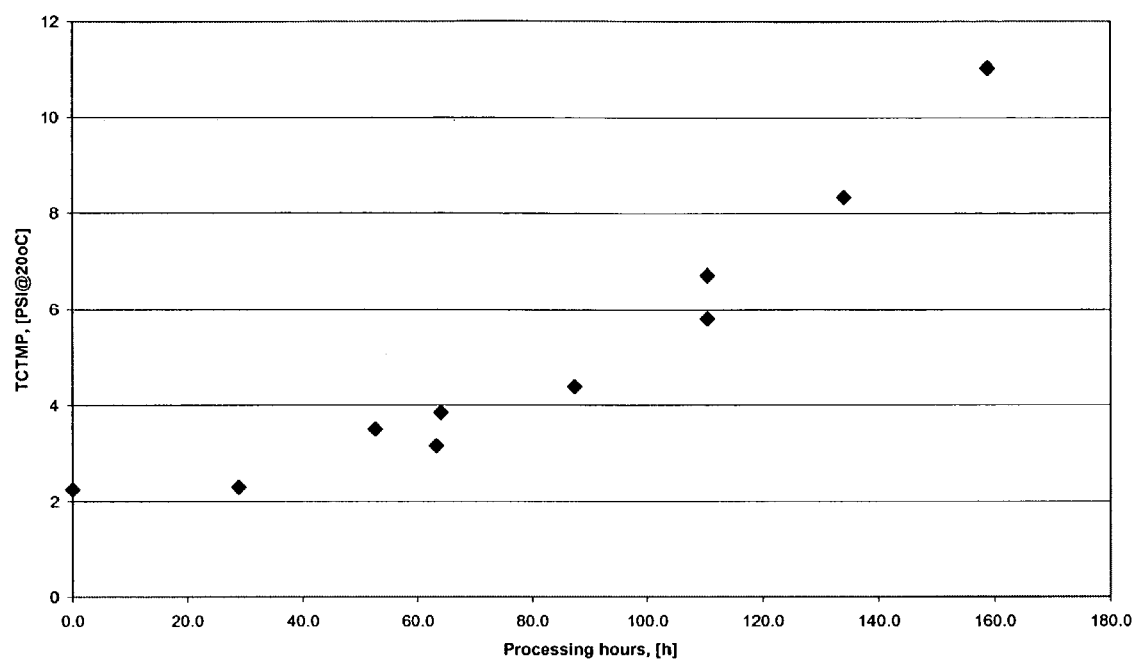
FIG. 17 illustrates the temperature compensated transmembrane pressure as a function of processing time for the test run described in Example 2.

The graph presented in FIG. 16 illustrates the constant flux obtained during the test, and the graph presented in FIG. 17 illustrates the trend of temperature compensated transmembrane pressure during the test.

The recovery of the system was quite high after the end of the recovery optimization step. The initial processing time was only 20 minutes and at the end was already 45 minutes. Since the amount of backwash water used for a single backwash process did not change significantly, by maintaining constant flux conditions the recovery increased accordingly. The calculation below gives information about both values:

Initial Recovery Conditions:
Volume of water produced for single processing cycle—360 gall;
Volume of water used for single backwash process—64 gall;
Recovery=82.2%.
Final Recovery Conditions:
Volume of water produced for single processing cycle—990 gall;
Volume of water used for single backwash process—59 gall;
Recovery=94%.

The value of 94% recovery is quite high for such type of feed water quality. Working with such high productivity by keeping fouling within acceptable limits has not been seen in recent UF practice. The study test proves that backwash step optimization keeps tremendous potential for system performance improvement. It also shows that using so described air during backwash, new type of on-line sensors for turbidity and relative simple algorithm, it can approach substantial better processing results compared to today know UF control philosophy.

While the invention has been described in detail with reference to certain preferred embodiments thereof, it will be understood that modifications and variations are within the spirit and scope of that which is described.

APPENDIX A

GENERICK HYDRAcap® SYSTEM OPTIMISATION ALGORITHM

Page A. The page describes initial set up the system form operator. Previous experiment for forward flush volume and duration is needed. The algorithm calculates initial backwash sequences duration based on input parameters limitations and forward flush experiment, and starts the system with them.

Parameters used:
- Initial Processing Time, [minutes] – the time between end on current backwash and beginning of next one
- Initial Desired Recovery, [%] – the recovery which is used for calculation on the initial duration on the backwash steps (BW Bottom, BW Top, Rinse)

$$Recovery = \frac{100 * BWVoll}{ProcessingVoll}, [\%]$$

where,

*BWVoll* - is vollume of water used for single backwash process, [gall];

*ProcessingVoll* - vollume of water used for single rpocessing cycle, [gall];

- Minimum allowed recovery, [%] – the recovery used further for limitation on the backwash steps duration.
- Flux, [gfd] – filtrate flow rate measured in gallons per square feet of membrane area per day (assuming 24 hours continual filtrate flow).
- Desired Time Between Chemical Cleanings, [day] – time in days that is used for calculation on the TMP slope. This time brings limitations in the TMP change during the time and guides change the backwash sequences duration. This parameter is moved in higher priority than recovery ratio.
- Membrane Module Active Area, [ft$^2$] – later abbreviated to Active Area or AA. The parameter is taken from modules spec sheet.
- Number of modules in the unit – when pilot unit is concerned, than total number of modules, if full-scale plant is concerned than number of modules per single rack.
- CEB Frequency [backwashes] – the number of backwashes after which a Chemical Enhanced Backwash will be taken.
- Process Volume, [gall] – volume of UF filtrate water produced for single processing cycle.
- BWVollume, [gall] – total volume of water used for single backwash process $$BWVollume = FFVollume + BWBVollume + BTTopVollume + RinseVollume, [gall]$$

where,

*FFVollume* – volume of raw water used in forward flush cycle, [gall]

*BWBVollume* - volume of filtered water used for backwsash bottom cycle, [gall]

*BWTVollume* - volume of filtered water used for backwash top cycle, [gall]

*RinseVollume* - volume of filtered water used for rinse cycle, [gall]

- BWBTime, [sec] – time duration on the backwash top cycle
- BWTTime, [sec] – time duration on the backwash top cycle
- FF$_{MAX}$ – limit for forward flush time, [s]

- $BWB_{MAX}$ – limit for backwash bottom time, [s]
- $BWT_{MAX}$ – limit for backwash top time, [s]
- $RINSE_{MAX}$ – limit for rinse time, [s]

Page B. The page determines the minimum number of processing/backwashes cycles ($NB_{\Delta TMP}$)to approach minimum confidential change on the Trans Membrane Pressure (TMP), which will be used for taking decision for changing backwash sequences duration. Number of backwash cycles is taken based on one difference in TMP called arbitrary $\Delta TMP$. This value is determined empirically based on visual observation during start up with different types of water. We propose range 0.1 – 1psi. Once current TMP begins to be higher than TMP for $NB_{\Delta TMP}$ number of backwashes ago plus $\Delta TMP$, the algorithm goes to change the backwash sequence duration. The decision is checked twice using double comparison. The turbidity in the transparent piece of pipes at the end of each backwash cycle is measured and stored. Later they are used for backwash sequences adjustment.

Parameters used:

- $TMP_{a[k]}$ – Trans membrane pressure after backwash at $k^{th}$ processing cycle, [psi]
- $TMP_{b[k]}$ – Trans membrane pressure before backwash at $k^{th}$ processing cycle, [psi]
- $NB_{\Delta TMPsens}$ – number of backwashes after which the TMP change should be $\Delta TMP$, based on linear approximation.
- $\Delta TMP$ – trans membrane pressure change choused as minimum for sensing the fouling and need of change backwash sequences.

Page C. The page describes a process reordering the values from turbidity at the end of each backwash step based on their current values. The vector $[NTU_{BW\_END}]$ contains this four NTU's based on the moment they have been measured i.e first is the value after forward flush $-NTU_{TOP\_FEED\_FF}$ and last is the value after rinse $-NTU_{RINSE}$. After reorder in new vector [MAX NTU], first is the turbidity having maximum value. Secondly the duration of each backwash step is changed depending on the turbidity after which step was the maximum.

Parameters used:

- $[NTU_{BW\_END}] = [NTU_{TOP\_FEED\_FF}; NTU_{BOTTOM\_FEED\_BWB}; NTU_{TOP\_FEED\_BW}; NTU_{RINSE}]$;
- $NTU_{TOP\_FEED\_FF}$ – turbidity in the top feed pipe after forward flush, [NTU]
- $NTU_{BOTTOM\_FEED\_BWB}$ – turbidity in the bottom feed pipe after backwash bottom, [NTU]
- $NTU_{TOP\_FEED\_BWT}$ – turbidity in the top feed line after backwash top, [NTU]
- $NTU_{RINSE}$ – turbidity after rinse step, [NTU]
- [MAXNTU] – vector containing same components as $[NTU_{BW\_END}]$ but in order of values (max first, min last)
- $FF_{timeNEW}$ – new time duration for forward flush step, [s]
- $BWB_{timeNEW}$ – new time duration for backwash bottom step, [s]
- $BWT_{timeNEW}$ – new time duration for backwash top step, [s]
- $RINSE_{timeNEW}$ – new time duration for rinse step, [s]
- $FF_{time}$ – current duration for forward flush step, [s]
- $BWB_{time}$ – current duration for backwash bottom step, [s]
- $BWT_{time}$ – current duration for backwash top step, [s]
- $RINSE_{time}$ – current duration for rinse step, [s]

Page D. The page calculates new recovery after change backwash sequences duration. It checks whether new durations are not out of range and goes out with or without change based on the result of the check.

No new parameters.

Page E. The page calculates new processing time duration based on stable performance after backwash sequence optimization.

No new parameters.

Page F. Page presents system response during feed water spike.

No new parameters.

Page G. Page presents basic functional diagram for interaction between modules in the program.

No new parameters.

APPENDIX B
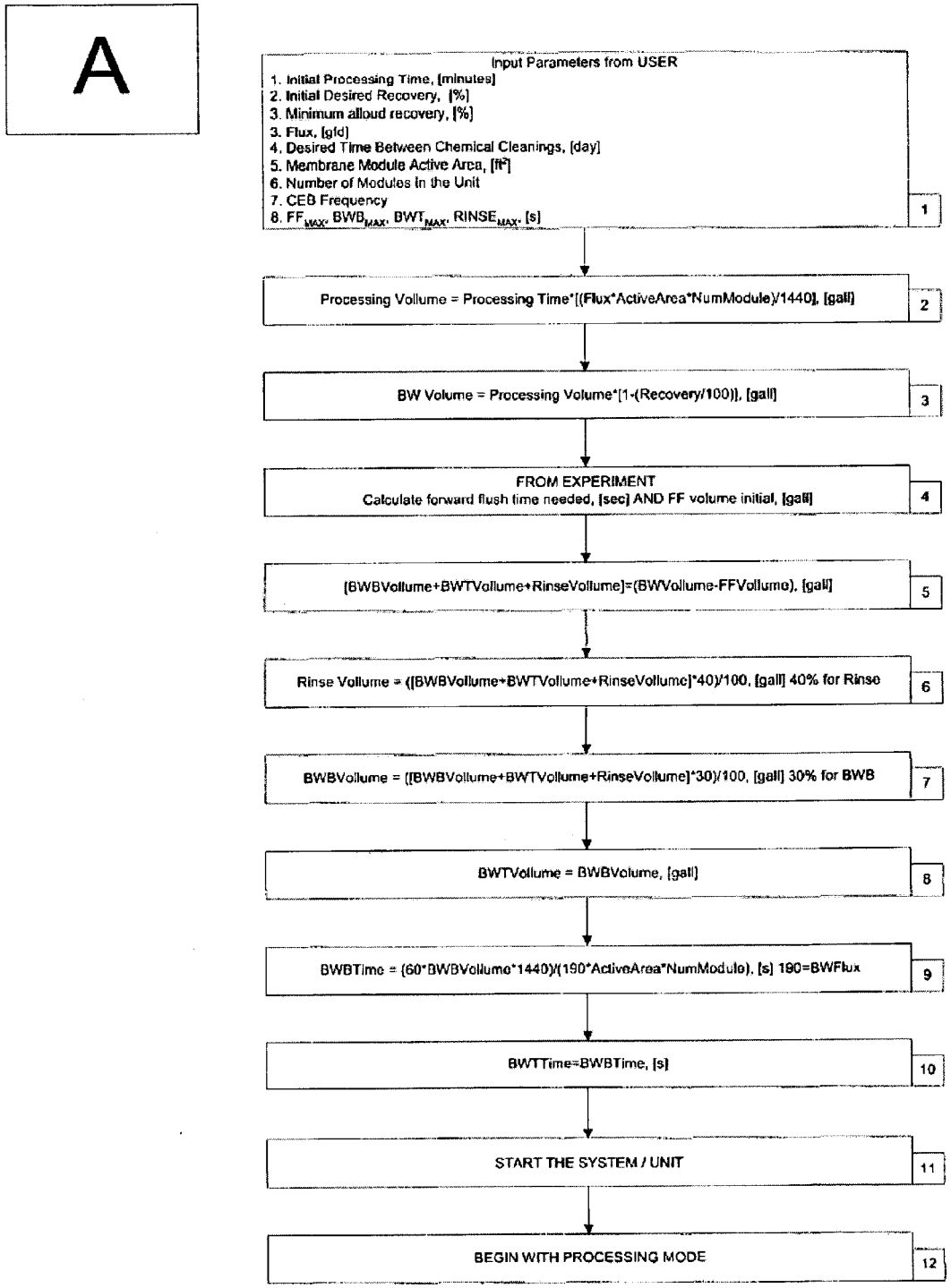

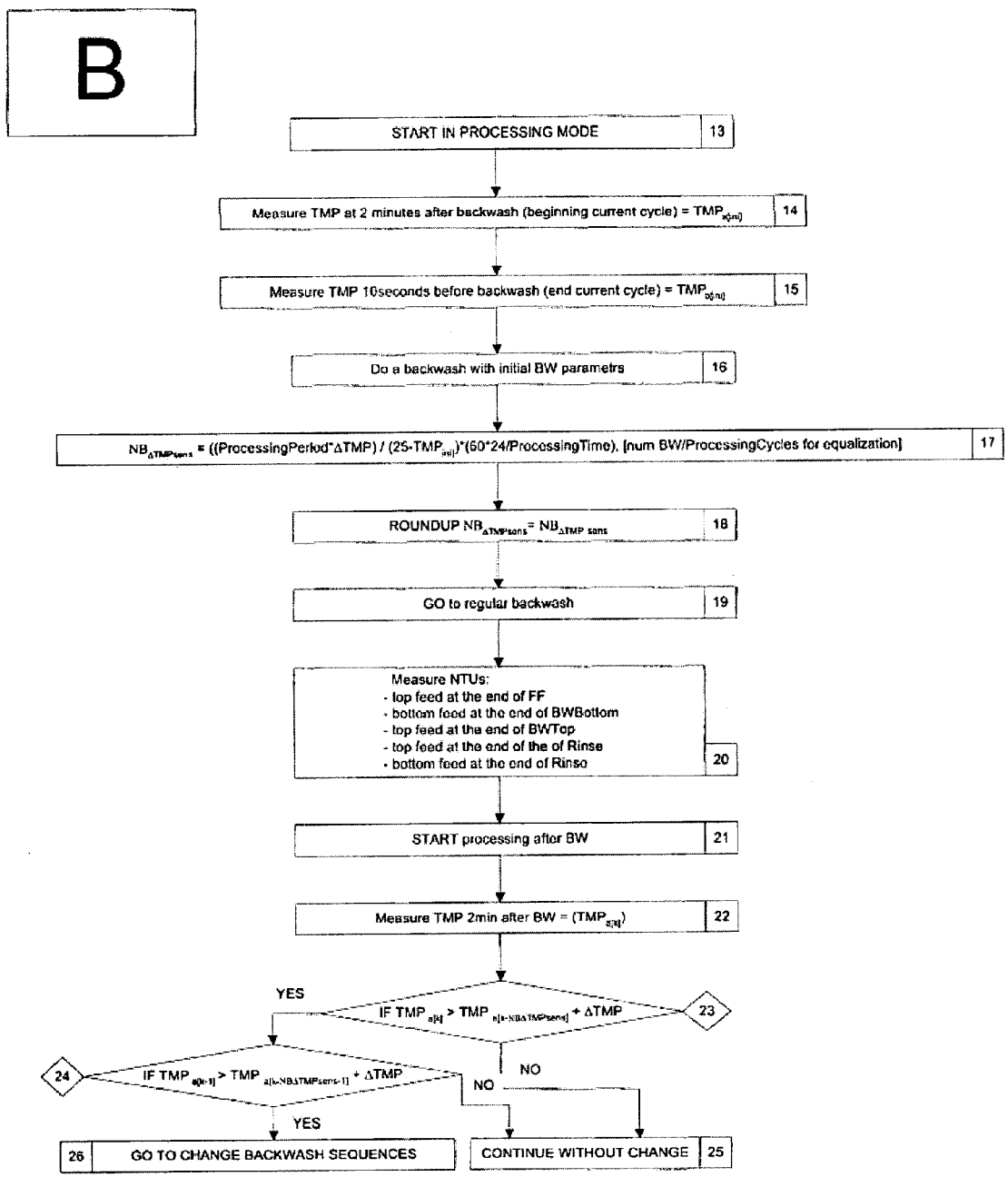

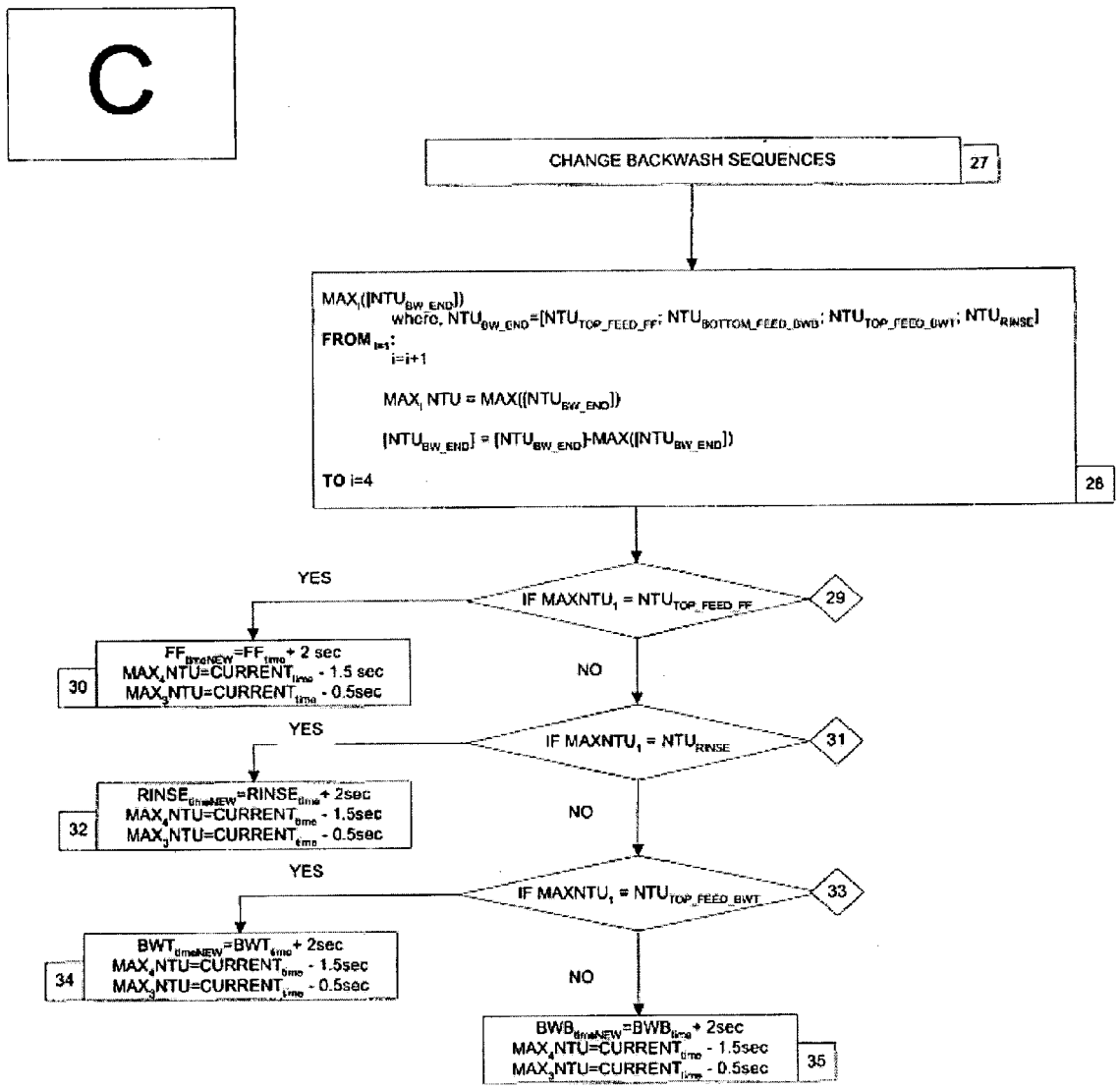

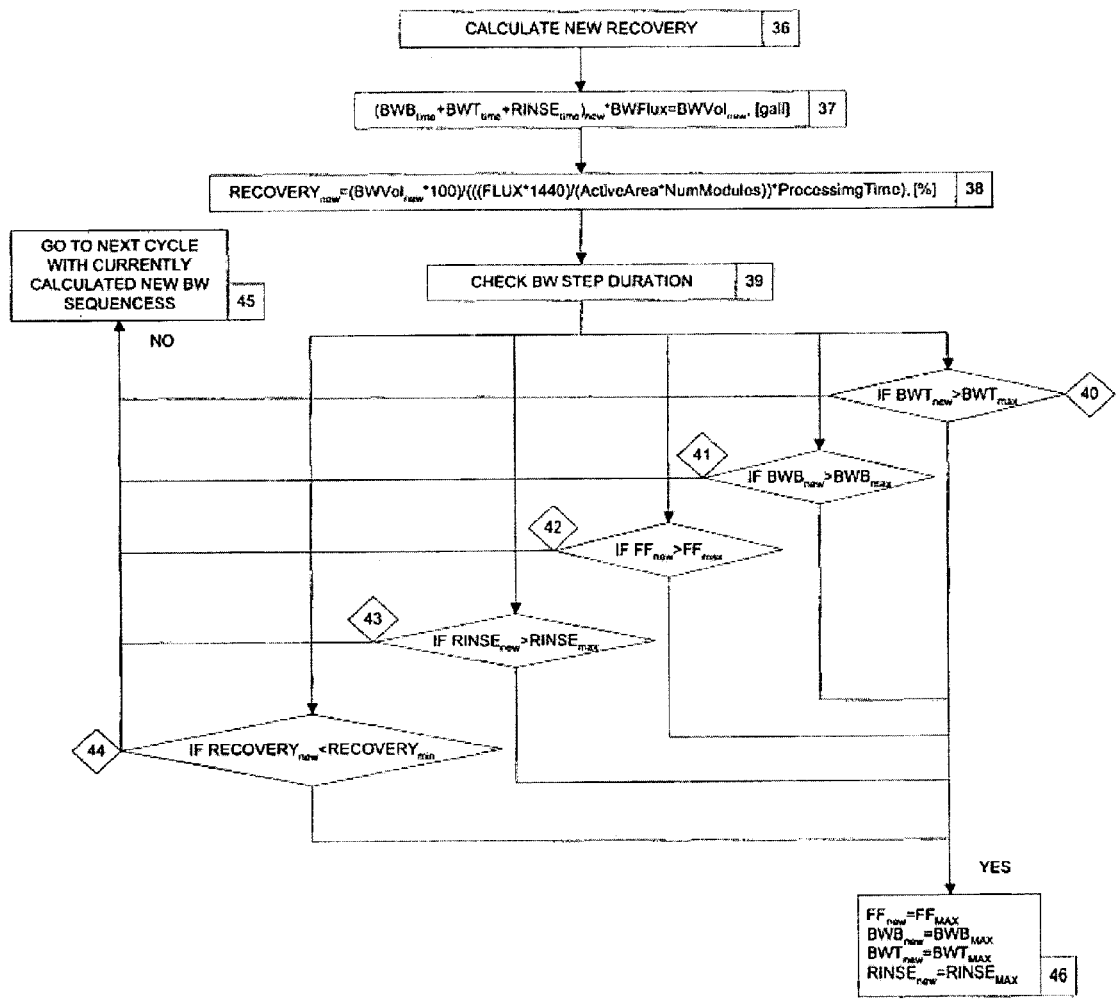

E
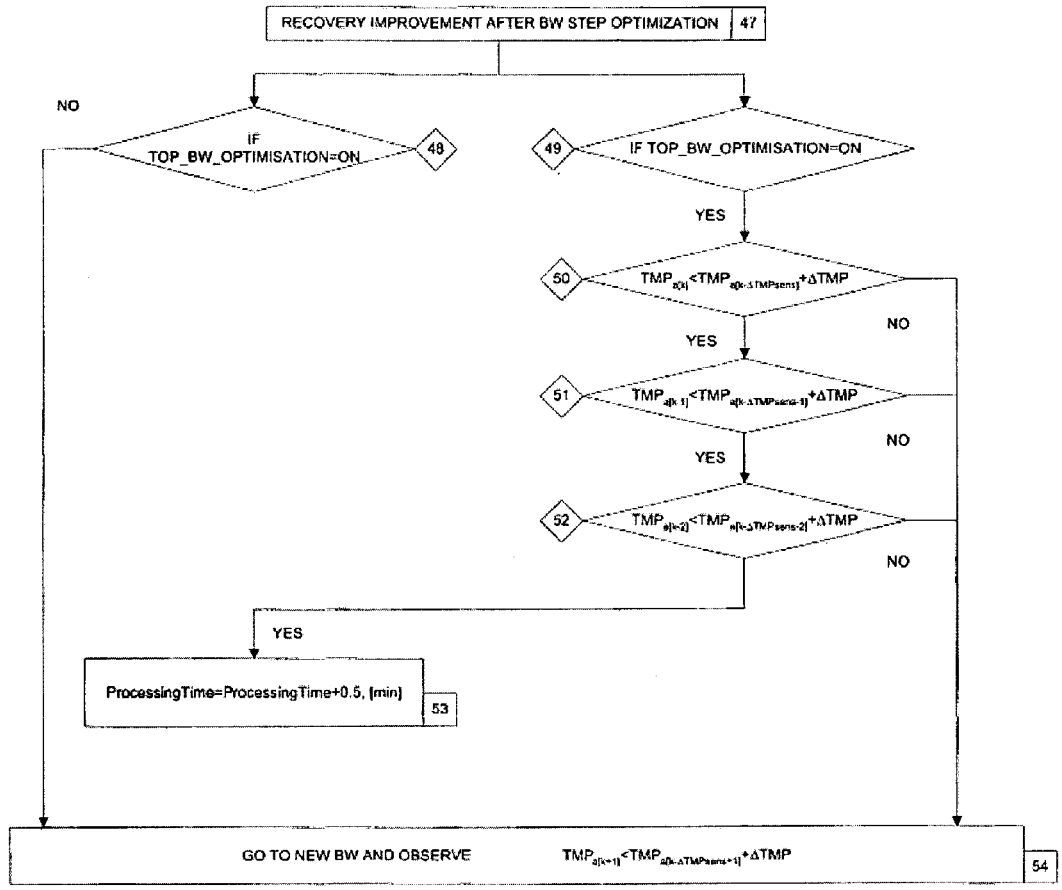

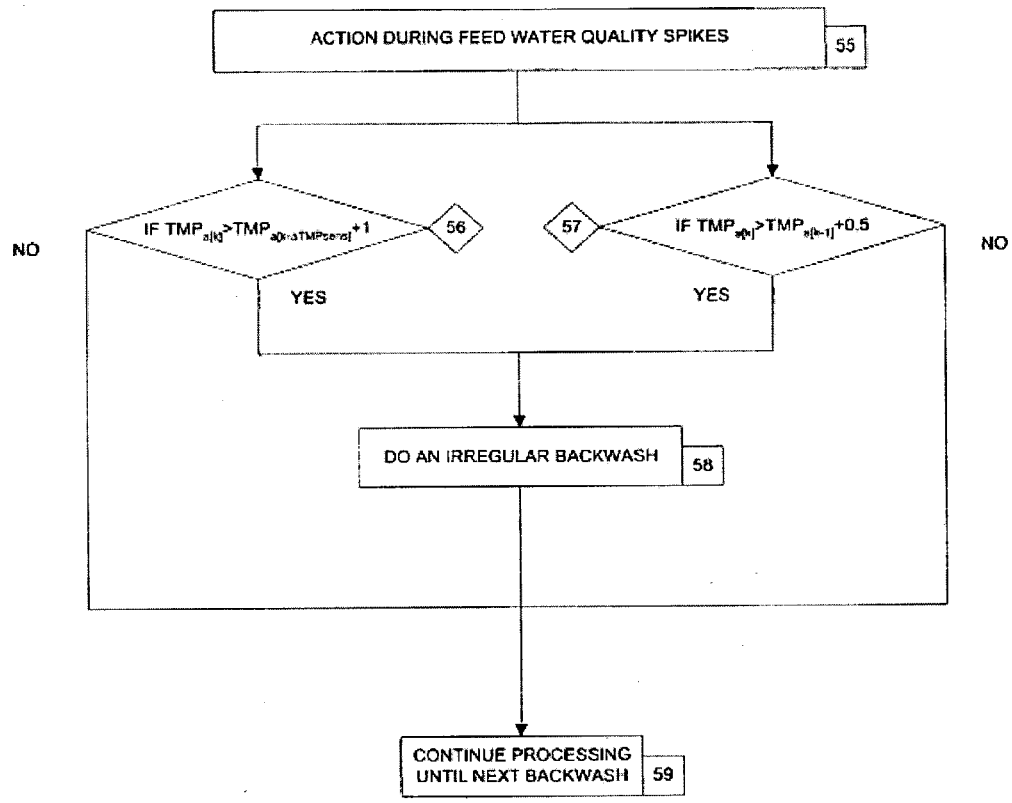

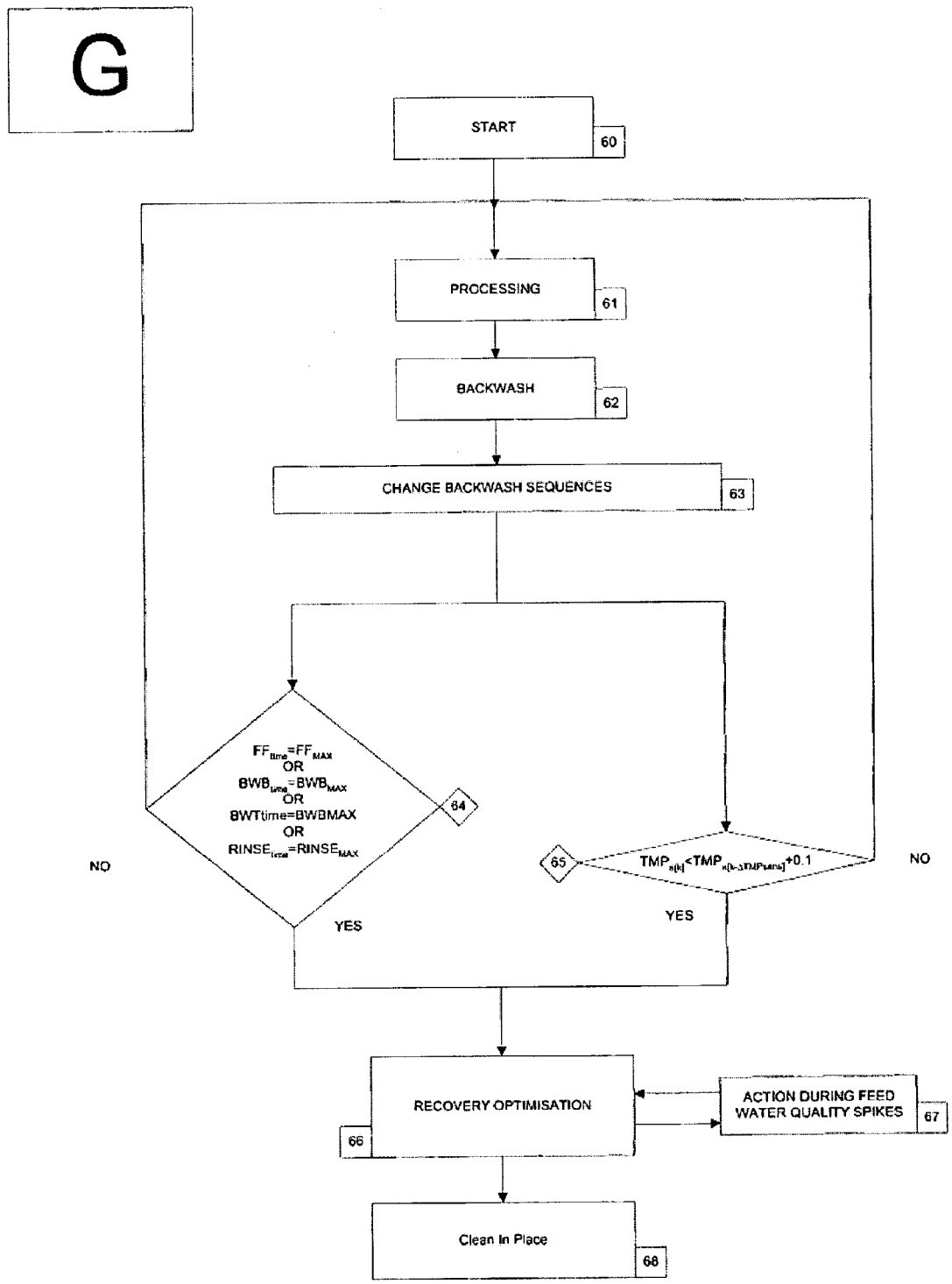

What is claimed is:

1. A method for improving performance of a filtration membrane module comprising a plurality of microporous hollow fibers, said method comprising subjecting said module to gas-assisted backwashing,
   wherein said gas-assisted backwashing comprises subjecting said fibers to:
   a) optional forward flushing,
   b) bottom backwashing,
   c) top backwashing,
   d) soaking, and
   e) rinsing, and
   further subjecting said fibers, at least once, before one or more of a), b), c), d) or e), to sufficient gas pressure on the lumen side thereof to provide fiber expansion without displacing water from the hollow fiber membrane pores, and to drain the liquid from the fibers by driving the fluid through the fibers,
   wherein said gas-assisted backwashing removes fouling components from said fibers, thereby improving performance of said filtration membrane module.

2. A method according to claim 1, wherein the effectiveness of said gas-assisted backwashing is determined by quantifying the amount of said fouling components removed from said fibers.

3. A method according to claim 2, wherein the amount of said fouling components removed from said fibers is quantified by a sensor unit attached to the module.

4. A method according to claim 3, wherein said sensor unit is attached to a top or bottom feed line on the module.

5. A method according claim 4, wherein said sensor unit is an optical sensor unit.

6. A method according to claim 1, wherein said gas is air.

7. A method according to claim 1, wherein the duration of said forward flushing is in the range of about 1 second up to about 120 seconds.

8. A method according to claim 7, wherein the duration of said forward flushing is in the range of about 15 seconds up to about 40 seconds.

9. A method according to claim 1, wherein said forward flushing is carried out at a pressure in the range of about 1 psi up to about 72 psi.

10. A method according to claim 9, wherein said forward flushing is carried out at a pressure in the range of about 20 psi up to about 30 psi.

11. A method according to claim 1, wherein the duration of each of said bottom and top backwashing is independently in the range of about 1 second up to about 60 seconds.

12. A method according to claim 11, wherein the duration of said bottom and top backwashing is independently in the range of about 5 seconds up to about 25 seconds.

13. A method according to claim 1, wherein each of said bottom and top backwashing is carried out independently at a pressure in the range of about 1 psi up to about 72 psi.

14. A method according to claim 13, wherein each of said bottom and top backwashing is carried out independently at a pressure in the range of about 30 psi up to about 40 psi.

15. A method according to claim 1, wherein the duration of said soaking is in the range of about 1 second up to about 900 seconds.

16. A method according to claim 15, wherein the duration of said soaking is in the range of about 30 seconds up to about 120 seconds.

17. A method according to claim 1, wherein said soaking is carried out at a pressure in the range of about 0 psi up to about 15 psi.

18. A method according to claim 17, wherein said soaking is carried out at a pressure m the range of about 0 psi up to about 5 psi.

19. A method according to claim 1, wherein the duration of said rinsing is in the range of about 1 second up to about 120 seconds.

20. A method according to claim 19, wherein the duration of said rinsing is in the range of about 5 seconds up to about 25 seconds.

21. A method according to claim 1, wherein said rinsing is carried out at a pressure in the range of about 1 psi up to about 72 psi.

22. A method according to claim 21, wherein said rinsing is carried out at a pressure in the range of about 30 psi up to about 40 psi.

23. A method according to claim 1, wherein the fibers are pressurized with gas for about 5 seconds up to about 300 seconds.

24. A method according to claim 23, wherein the fibers are pressurized with gas for about 20 seconds up to about 60 seconds.

25. A method according to claim 1, wherein the fibers are pressurized with gas to a pressure in the range of about 1 psi up to about 50 psi.

26. A method according to claim 25, wherein the fibers are pressurized with gas to a pressure in the range of about 15 psi up to about 20 psi.

27. A method according to claim 1 wherein said fibers are pressurized with gas before step a).

28. A method according to claim 1 wherein said fibers are pressurized with gas before step b).

29. A method according to claim 1 wherein said fibers are pressurized with gas before step c).

30. A method according to claim 1 wherein said fibers are pressurized with gas before step d).

31. A method according to claim 1 wherein said fibers are pressurized with gas before step or e).

32. A method for cleaning a hollow fiber membrane, said method comprising subjecting said membrane to gas-assisted backwash, wherein said gas-assisted backwash comprises:
   a) optional forward flushing,
   b) bottom backwashing,
   c) top backwashing,
   d) soaking, and
   e) rinsing, and
   further subjecting said hollow fiber membrane, at least once, before one or more of a), b), c), d) or e), to sufficient gas pressure on the lumen side thereof to provide expansion of said hollow fiber membrane without displacing water from the hollow fiber membrane pores, and to drain the liquid from said hollow fiber membrane by driving the fluid through the membrane.

33. A method for increasing filtrate flow rate through a membrane, said method comprising subjecting said membrane to a gas-assisted backwash, wherein said gas-assisted backwash comprises;
   a) optional forward flushing,
   b) bottom backwashing,
   c) top backwashing,
   d) soaking, and
   e) rinsing, and
   further subjecting said membrane, at least once, before one or more of a), b), c), d) or e), to sufficient gas pressure on the lumen side thereof to provide fiber expansion of said membrane without displacing water from the hollow fiber membrane pores, and to drain the liquid from said membrane by driving the fluid through the membrane.

* * * * *